(12) United States Patent
Hurley et al.

(10) Patent No.: US 9,134,457 B2
(45) Date of Patent: Sep. 15, 2015

(54) MULTISCALE DIGITAL ROCK MODELING FOR RESERVOIR SIMULATION

(75) Inventors: Neil Francis Hurley, Boston, MA (US); Weishu Zhao, Al-Khobar (SA); Tuanfeng Zhang, Lexington, MA (US)

(73) Assignee: Schlumberger Technology Corporation, Cambridge, MA (US)

(*) Notice: Subject to any disclaimer, the term of this patent is extended or adjusted under 35 U.S.C. 154(b) by 856 days.

(21) Appl. No.: 13/036,770

(22) Filed: Feb. 28, 2011

(65) Prior Publication Data
US 2012/0221306 A1  Aug. 30, 2012

(51) Int. Cl.
G06G 7/50 (2006.01)
G06G 7/48 (2006.01)
G01V 99/00 (2009.01)

(52) U.S. Cl.
CPC .................. G01V 99/005 (2013.01)

(58) Field of Classification Search
CPC ..... G06T 7/0081; G06T 7/602; G06T 7/0004; G06T 2207/10056; G06T 2207/20148; G06T 2207/20152; G06T 2207/30108; G06F 2217/16; G06F 17/5009; G06F 17/5018; G06F 2217/10; G01V 11/00; G01V 99/00; G01V 99/005; G01N 21/6458; G01N 33/18; G01N 33/1826
USPC .......................................... 703/9, 10
See application file for complete search history.

(56) References Cited

U.S. PATENT DOCUMENTS

| | | | |
|---|---|---|---|
| 5,233,568 A | 8/1993 | Kan et al. | |
| 5,835,883 A | 11/1998 | Neff et al. | |
| 6,826,520 B1 | 11/2004 | Khan et al. | |
| 6,886,632 B2 | 5/2005 | Raghuraman et al. | |
| 7,224,162 B2 | 5/2007 | Proett et al. | |
| 7,765,091 B2 | 7/2010 | Lee et al. | |
| 7,783,462 B2 | 8/2010 | Landis, Jr. et al. | |
| 8,095,349 B2 | 1/2012 | Kelkar et al. | |

(Continued)

FOREIGN PATENT DOCUMENTS

WO   2009/155127 A1   12/2009

OTHER PUBLICATIONS

Zhang et al. (Numerical modelling of heterogeneous carbonates and multi-scale dynamics, 2009 (12 pages)).*

(Continued)

*Primary Examiner* — Kamini S Shah
*Assistant Examiner* — Andre Pierre Louis

(57) ABSTRACT

Methods for upscaling digital rock modeling data are described. Core-plug samples for pore-scale modeling are chosen using whole-core mini-permeability grids and conventional CT scans. Pore models or pore-network models are used for flow modeling. Borehole-scale models use MPS (Multi-Point Statistics) to combine mini-permeability grids and conventional CT scans of whole core with electrical borehole images to create 3D numerical pseudocores for each RRT (Reservoir Rock Type). Effective SCAL properties computed from various MPS borehole-scale realizations or models are used to populate interwell-scale models for each RRT. Effective properties computed from flow simulations for interwell volumes are used to populate full-field scale models. At the full-field scale, outcrop analogs, sequence stratigraphy, forward stratigraphic models, diagenetic models, and basin-scale models are combined using MPS to improve flow simulations. At every stage, REVs (representative element volumes) are computed to be certain rock heterogeneities have been captured.

33 Claims, 13 Drawing Sheets

(56) References Cited

U.S. PATENT DOCUMENTS

| | | | |
|---|---|---|---|
| 8,311,788 B2 | 11/2012 | Hurley et al. | |
| 2007/0265813 A1 | 11/2007 | Unal et al. | |
| 2009/0259446 A1 | 10/2009 | Zhang et al. | |
| 2009/0262603 A1 | 10/2009 | Hurley et al. | |
| 2010/0155142 A1* | 6/2010 | Thambynayagam et al. | 175/61 |
| 2010/0299125 A1* | 11/2010 | Ding et al. | 703/10 |
| 2010/0326669 A1 | 12/2010 | Zhu et al. | |
| 2011/0004447 A1 | 1/2011 | Hurley et al. | |
| 2011/0015907 A1* | 1/2011 | Crawford et al. | 703/2 |
| 2012/0275658 A1 | 11/2012 | Hurley et al. | |
| 2012/0277996 A1 | 11/2012 | Hurley et al. | |
| 2012/0281883 A1 | 11/2012 | Hurley et al. | |

OTHER PUBLICATIONS

Neimi et al., Hydraulic characterization and upscaling of fracture networks based on multiple-scale well test data, 2000, 18 pages.*
Guerillot (From Geological modeling to flow simulation to forecast oil and gas reservoir production, 2004, (pp. 1-37)).*
Geocosm, http://www.geocosm.net/, Oct. 10, 2010, pp. 1-5.
Bear, J., "Dynamics of fluids in porous media", Elsevier, New York, 1972, pp. 13-26 and 38-57.
Bourke, L.T., "Core permeability imaging: It's relevance to conventional core characterization and potential application to wireline measurement", Marine and Petroleum Geology, vol. 10, Aug. 1993, pp. 318-324.
Christie, M.A., "Upscaling for reservoir simulation", Journal of Petroleum Technology, vol. 48 (11), 1996, pp. 1004-1010.
Coates, et al., "NMR Logging Principles & Applications", Haliburton Energy Services, 1999, 251 pages.
Dehghani, et al., "Modeling a vuggy carbonate reservoir, McElroy Field, West Texas", AAPG Bulletin, vol. 83 (1), Jan. 1999, pp. 19-42.
Durlofsky, L. J., "Upscaling of geocellular models for reservoir flow simulation: A review of recent progress", 7th International Forum on Reservoir Simulation, Buhl/Baden-Baden, German, Jun. 23-27, 2003, pp. 1-58.
Guardiano, et al., "Multivariate geostatistics: Beyond bivariate moments", Geostatistics—Troia, A. Soares. Dordrecht, Netherlands, Kluwer Academic Publications, vol. 1, 1993, pp. 133-144.
Hurley, et al., "Method to generate fullbore images using borehole images and multi-point statistics", SPE 120671—Middle East Oil & gas Show Conference, Bahrain, Mar. 15-18, 2009, 18 pages.
Ireservoir, http://www.ireservoir.com/case_jonah.html, Oct. 10, 2010, 2 pages.
Jackson, et al., "Upscaling permeability measurements within complex heterolithic tidal sandstones", Mathematical Geology, vol. 35 (5), Jul. 2003, pp. 499-520.
Jackson, et al., "Three-dimensional reservoir characterization and flow simulation of heterolithic tidal sandstones", AAPG Bulletin, vol. 89 (4), Apr. 2005, pp. 507-528.
Jennings, "Capillary pressure techniques: Application to exploration and development geology", AAPG Bulletin, vol. 71 (10), Oct. 1987, pp. 1196-1209.
Knackstedt, et al., "Digital core laboratory: Properties of reservoir core derived from 3D images", SPE 87009—Asia-Pacific Conference on Integrated Modeling for Asset Management, Feb. 2, 1992, 14 pages.
Lasseter, et al., "Reservoir heterogeneities and their influence on ultimate recovery", Reservoir Characterization: Academic Press, Orlando, Florida, 1986, pp. 545-559.
Levy, et al., "Geomorphology of Carbonate Systems and Reservoir Modeling: Carbonate Training Images, FDM Cubes, and MPS Simulations", AAPG Annual Convention, Long Beach, CA, Apr. 1-4, 2007, 6 pages.
Levy, et al., "Importance of facies-based earth models for understanding flow behavior in carbonate reservoirs (abs.)", AAPG Annual Convention, Long Beach, California, Apr. 1-4, 2007, 25 pages.
Neal, et al., "Sequence stratigraphy—A global theory for local success", Oilfield Review, Jan. 1993, pp. 51-62.

Norris, et al., "The Geological Modeling of Effective Permeability in Complex Heterolithic Facies", SPE 22692—SPE Annual Technical Conference and Exhibition, Dallas, Texas, Oct. 6-9, 1991, pp. 359-374.
Okabe, et al., "Pore space reconstruction of vuggy carbonates using microtomography and multiple-point statistics", Water Resources Research, vol. 43 (12), 2007, 5 pages.
Okabe, et al., "Pore space reconstruction using multiple-point statistics", Journal of Petroleum Science and Engineering, vol. 46, 2005, pp. 121-137.
Okabe, et al., "Pore-scale heterogeneity assessed by the lattifce-Boltzmann method", International Symposium of the Soc. of Core Analysts, Trondheim, Norway, Sep. 12-16, 2006, 7 pages.
Okabe, et al., "Prediction of permeability for porous media reconstructed using multiple-point statistics", Physical Review E, vol. 70, 2004, 10 pages.
Petromod, http://www.ies.de/, Oct. 10, 2010, 2 pages.
Pittman, "Relationship of porosity and permeability to various parameters derived from mercury injection-capillary pressure cureves for sandstone", AAPG Bulletin, vol. 76 (2), Feb. 1992, pp. 191-198.
Pranter, et al., "Scales of lateral petrophysical heterogeneity in dolomite lithofacies as determined from outcrop analogs: Implications for 3-D reservoir modeling", AAPG Bulletin, vol. 89, 2005, pp. 645-662.
Pyrcz, et al., "The whole story on the hole effect", Searston, S. (ed.) Geostatistical Association of Australasia Newsletter, vol. 18, May 2003, 16 pages.
Qi, D., "Upscaling theory and application techniques for reservoir simulation", Lambert Academic Publishing, Saarbrucken, Germany, 2009, 7 pages.
Ramamoorthy, et al., "A new workflow for petrophysical and textural evaluation of carbonate reservoirs", Paper B—SPWLA 49th Annual Logging Symposium, Edinburgh, Scotland, May 25-28, 2008, 15 pages.
Sedsim, https://wiki.csiro.au/confluence/display/seabedchange/Home, Oct. 10, 2010, 2 pages.
Strebelle, "Conditional simulation of complex geological structures using multiple point statistics", Mathematical Geology, vol. 34 (1), Jan. 2002, pp. 1-22.
Tomutsa, et al., "Analysis of chalk petrophysical properties by means of submicron-scale pore imaging and modeling", SPE Reservoir Evaluation and Engineering, vol. 10, Jun. 2007, pp. 285-293.
Wu, et al., "3D stochastic modeling of heterogeneous porous media—Applications to reservoir rocks", Transport in Porous Media, vol. 65, 2006, pp. 443-467.
Wu, et al., "Validation of methods for multi-scale pore space reconstruction and their use in prediction of flow properties of carbonate", International Symposium of the Society of Core Analysts, Abu Dhabi, 2008, 12 pages.
Zhang, et al., "Numerical Modeling of Heterogeneous Carbonates and Multi-Scale Dynamics", SPWLA 50th Annual Logging Symposium, The Woodlands, Texas, Jun. 21-24, 2009, 12 pages.
Zhang, et al., "Pore scale study of flow in porous media: Scale dependency, REV, and statistical REV", Geophysical Research Letters, vol. 27 (8), Apr. 2000, pp. 1195-1198.
Zhang, T., "Filter-based training image pattern classification for spatial pattern simulation", PhD dissertation, Sanford University, Palo Alto, CA, Mar. 2006, 153 pages.
Dong, H., "Micro-CT Imaging and Pore Network Extraction", Unpublished Ph.D. Dissertation, Imperial College, 2007, 213 pages.
Harris, Paul M., "Delineating and quantifying depositional facies patterns in carbonate reservoirs: Insight from modern analogs", AAPG Bulletin, vol. 94(1), Jan. 2010, pp. 61-86.
Tweheyo et al., "SCA2005-72: Pore Characteri[z]ation, Relating Mining Permeability and CT-Scan Porosity of Carbonate Cores," International Symposium of the Society of Core Analysis, 2005: pp. 1-7.
Russian Final Office Action for corresponding Russian Application Serial No. 2013143803 dated Dec. 19, 2014, 14 pages.

* cited by examiner

MULTISCALE DIGITAL ROCK MODELING FOR RESERVOIR SIMULATION

Cross-Reference to Related Applications

The subject matter of this patent specification relates to the subject matter of the following commonly assigned applications: U.S. patent application entitled "Method to build 3D digital models of porous media using transmitted laser scanning confocal mircoscopy and multi-point statistics", Ser. No. 12/459,414, filed on Jul. 1, 2009, U.S. patent application entitled "Method to quantify discrete pore shapes, volumes, and surface areas using confocal profilometry", Ser. No. 12/459,454, filed on Jul. 1, 2009, U.S. patent application entitled "Method for characterizing a geological formation traversed by a borehole", Ser. No. 12/384,945, filed Apr. 10, 2009, U.S. patent application entitled "Method to generate numerical pseudocores using borehole images, digital rock samples, and multi-point statistics", Ser. No. 12/384,721, filed Apr. 8, 2009, U.S. patent application entitled "Methods to build 3D digital models of porous media using a combination of high- and low-resolution data and multi-point statistics", U.S. Pat. No. 8,908,925, filed Feb. 28, 2012, U.S. patent application entitled "Methods of using petrographic image analysis to determine capillary pressure in porous media", U.S. Pat. No. 8,909,508, filed Feb. 28, 2012,; and U.S. patent application entitled "Method to determine representative element areas and volumes in porous media", U.S. Publication No. 2012-0277996, filed Feb. 28, 2012 Each of the above-referenced patent applications is incorporated by reference herein.

FIELD

This patent specification generally relates to methods for characterizing three-dimensional (3D) samples of reservoir rock. More particularly, this patent specification relates to upscaling digital rock modeling data.

BACKGROUND

Reservoir modeling is the process of building a digital representation of a reservoir that incorporates all characteristics pertaining to its ability to store and produce hydrocarbons. Reservoir models are subdivided into static and dynamic components. Static models are fine-scale simulations of rock properties such as porosity, permeability, capillary pressure, fractures, faults, seismic attributes, and parameters that do not change significantly with time. Dynamic models are coarser simulations that incorporate fluid properties that change with time, such as pressure and flow rates of oil, gas, and water.

Reservoir modeling covers at least 12 orders of magnitude, ranging from pore (nm to micron) to borehole (mm to m) to interwell (10's to 100's of m) to full-field scale (10's of km). Reservoir rocks are complex and heterogeneous at all scales. Multiscale simulation is a major goal of the petroleum industry, and many upscaling approaches have been proposed. See, e.g. Christie, M. A., 1996, Upscaling for reservoir simulation: JPT, v. 48, No. 11, p. 1004-1010 (hereinafter "Christie 1996"); and Durlofsky, L. J., 2003, Upscaling of geocellular models for reservoir flow simulation: A review of recent progress: 7$^{th}$ International Forum on Reservoir Simulation, Buhl/Baden-Baden, Germany, June 23-27, p. 58 (hereinafter "Durlofsky 2003"). Most of these conventional upscaling approaches start with fine-scale reservoir models that are coarsened to a model that typical fluid flow simulators can handle. The biggest challenge in this type of upscaling occurs because it is commonly difficult to preserve essential geologic heterogeneities in the resulting coarse models.

Heterogeneity can be defined as the variation in rock properties as a function of location within a reservoir or formation. Many reservoirs are heterogeneous because mineralogy, grain type and size, depositional environment, porosity, permeability, natural fractures, faults, channels, and other attributes vary from place to place. Heterogeneity causes problems in formation evaluation and reservoir simulation because reservoirs occupy enormous volumes, but there is limited core and log control. For example, a typical grid block used in a reservoir simulator is 250 m×250 m×1 m, borehole-scale numerical pseudocores represent rock volumes on the cubic-meter scale, and core plugs and microCTscans or confocal scans represent even smaller volumes.

A geocellular model is a layered, gridded 3D model. Layers can have zero thickness, as in the case of bed pinch outs or truncations. Layers can be as thin as the spacing of log measurements, or they can be thicker, to reflect the known thickness of rock layers. Geocellular models capture geologic-scale heterogeneities, and commonly have millions of cells.

Upscaling is the process of converting rock properties from fine scales to coarser scales. Upscaling algorithms assign suitable values of porosity, permeability, and other flow functions to each coarser grid block. See, Lasseter, T. J., Waggoner, J. R., and Lake, L. W., 1986, Reservoir heterogeneities and their influence on ultimate recovery, in Lake, L. W., and Carroll, H. B., Jr., eds., Reservoir Characterization: Academic Press, Orlando, Fla., p. 545-559 (hereinafter "Lasseter 1986"); Christie 1996; and Durlofsky 2003. Upscaling is necessary because reservoir simulators cannot handle the large number of cells in typical geocellular models.

There have been many upscaling attempts in reservoir simulation. Common approaches are summarized in: Lasseter 1986, Christie 1996, and Durlofsky 2003. A number of authors have used multi-point statistics (MPS) and representative element volume (REV) concepts in digital rock modeling. Okabe and Blunt (2004, 2005, 2007) used MPS to generate 3D pore systems from 2D thin sections. See, Okabe, H., and Blunt, M. J., 2004, Prediction of permeability for porous media reconstructed using multiple-point statistics: Physical Review E, v. 70, 10 p; Okabe, H., and Blunt, M. J., 2005, Pore space reconstruction using multiple-point statistics: Journal of Petroleum Science and Engineering, v. 46, p. 121-137; and Okabe, H., and Blunt, M. J., 2007, Pore space reconstruction of vuggy carbonates using microtomography and multiple-point statistics: Water Resources Research, v. 43. These authors assume that the 2D horizontal view was the same as the 2D vertical view, and proceeded to generate their model. Because of this assumption, their model does not capture rock heterogeneity, and does not depict true 3D pore geometry. MPS has been used to model carbonate facies tracts. See, Harris, P. M., 2009, Delineating and quantifying depositional facies patterns in carbonate reservoirs: Insight from modern analogs: AAPG Bulletin, v. 94, p. 61-86. MPS has been used to generate borehole-scale numerical rock models. See, Zhang, T., Hurley, N. F., and Zhao, W., 2009, Numerical modeling of heterogeneous carbonates and multi-scale dynamics: Presented at the SPWLA 50th Annual Logging Symposium, The Woodlands, Tex., June 21-24 (hereinafter "Zhang 2009"). Concepts of representative element volume (REV) and area (REA) have been applied to an outcrop photo of heterolithic sediments. See, Norris, R. J., and Lewis, J. J. M., 1991, The geological modeling of effective permeability in complex heterolithic facies: SPE Preprint 22692, Presented at the 66th Annual Technical Conference and Exhibition, Dallas, Tex., October 6-9, p. 359-374. REV has been discussed in relation to work with permeabilities in outcrop blocks of heterolithic sediments. See, Jackson, M. D., Muggeridge, A. H., Yoshida, S., and Johnson, H. D., 2003, Upscaling permeability measurements within complex heterolithic tidal sandstones: Mathematical Geology, v. 35, p. 499-520; and Jackson, M. D., Yoshida, S., Muggeridge, A. H., and Johnson, H. D., 2005, Three-dimensional reservoir characterization and flow simulation of heterolithic tidal sandstones: AAPG Bulletin, v. 89, p. 507-528. The concept of REV has been used in pore-scale digital rock models. However, because they used overlapping sub-volumes, they obtained questionable results. See, Zhang, D., Zhang, R., Chen, S., Soll, W. E., 2000, Pore scale study of flow in porous media: Scale dependency, REV, and statistical REV: Geophysical Research Letters, v. 27, No. 8, p. 1195-1198; and Okabe, H., and Oseto, K., 2006, Pore-scale heterogeneity assessed by the lattice-Boltzmann method: International Symposium of the Soc. of Core Analysts, Trondheim, Norway, September 12-16, Paper SCA2006-44, 7 p. The minimized variance concept of REV has been used to coarsen (upscale) reservoir simulations. See, Qi, D., 2009, Upscaling theory and application techniques for reservoir simulation: Lambert Academic Publishing, Saarbrücken, Germany, 230 p. (hereinafter "Qi 2009").

3D pore-scale models have been built using 2D thin sections, using an approach known as Markov Chain Monte Carlo simulation. See, Wu, K., Van Dijke, M. I. J., Couples, G. D., Jiang, Z., Ma, J., Sorbie, K. S., Crawford, J., Young, I., and Zhang, X., 2006, 3D stochastic modelling of heterogeneous porous media—Applications to reservoir rocks: Transport in Porous Media, v. 65, p. 443-467. Upscaling questions have been addressed by building composite pore models using thin section scans of different resolution. See, Wu, K., Ryazanov, A., van Dijke, M. I. J., Jiang, Z., Ma, J., Couples, G. D., and Sorbie, K. S., 2008, Validation of methods for multi-scale pore space reconstruction and their use in prediction of flow properties of carbonate: Paper SCA2008-34, International Symposium of the Society of Core Analysts, Abu Dhabi, October 29-November 2, 12 p., which states: "One possible approach is to refine the coarser scale 3D image to equivalent resolution as the finer scale and then combine these two structures with the same volume into a single model." The finer scale image is "superimposed" on the coarser scale image to form an integrated structure. See, id.

U.S. Pat. No. 6,826,520 describes a method to upscale permeability using a Voronoi computational grid. U.S. Pat. No. 7,224,162 describes a method to estimate properties of a geologic formation, using well log data such as nuclear magnetic resonance, resistivity, and other logs. The method acquires directional formation property values and generates a directional property log. U.S. Pat. No. 7,783,462 describes a method to populate a three dimensional reservoir framework having a plurality of cells with one or more constant reservoir property values. U.S. Pat. No. 7,765,091 describes a multi-scale method for reservoir simulation using a finite-volume method.

U.S. Patent Application Publ. No. 2011-0004448 describes a method to build 3D digital models of porous media using reflected white-light and laser scanning confocal profilometry and multi-point statistics. U.S. Patent Application Publ. No. 2011-0004447 describes a method to build 3D digital models of porous media using transmitted laser scanning confocal microscopy and multi-point statistics. The pore-scale REV concept is also discussed. U.S. Patent Application Publ. No. 2009-0262603 describes a method to generate full-bore images from borehole images. U.S. Patent Application Publ. No. 2009-0259446 describes a method to generate numerical pseudocores from conventional CT scans and full-bore images using multi-point statistics.

SUMMARY

According to some embodiments, a method for upscaling with a processing system borehole-scale digital rock modeling data representing reservoir rock is provided. The method includes combining the borehole-scale digital rock modeling data with interwell-scale source data to generate interwell-scale digital rock modeling data that captures heterogeneity at an interwell-scale. A plurality of reservoir rock types are preferably identified in the borehole-scale digital rock modeling data. The interwell-scale source data is preferably gathered using logging while drilling of non-vertical wells, crosswell geophysical measurements, and seismic measurements; and can include computed variogram statistics. The upscaling process preferably includes use of computed values at a borehole-scale, of porosity, permeability, capillary pressure and/or relative permeability. According to some embodiments other values can be used for the upscaling such as: resistivity indices, water saturations, irreducible water saturations, residual oil saturations, recovery factors, and Archie cementation (m) and saturation (n) exponents. The digital rock modeling data preferably includes results of multi-point statistics, and representative element volumes.

The borehole-scale digital rock modeling data has preferably been upscaled from pore-scale digital rock modeling data using computed values at a pore-scale, of porosity, permeability, capillary pressure and/or relative permeability. The pore-scale digital rock modeling data is preferably generated using minipermeability and conventional computed tomography (CT) scan data of one or more core slabs, having a gridded spacing of miniperm data between about 0.5 cm and about 1 cm, and a CT scan slice spacing of about 1 mm to 2 mm. Minipermeability and CT scan data are preferably used to identify subvolumes of rock known as petrophysical facies. Petrophysical facies are preferably characterized using 2D and 3D transmitted laser scanning fluorescence microscopy at a resolution of about 250 nm per pixel or voxel, microCT scans at a resolution of about 1 to 5 microns per voxel, nanoCT scans at a resolution of about 50 nm to 60 nm per voxel, focused ion beam-scanning electron microscopy (FIB-SEM) at a resolution of about 5 nm to 10 nm per pixel using closely spaced serial sections, mercury injection capillary pressure (MICP), and/or nuclear magnetic resonance (NMR).

The method can also include upscaling the generated interwell-scale digital rock modeling data to generate full-field-scale digital rock modeling data, based on computed values at an interwell-scale, of porosity, permeability, capillary pressure and/or relative permeability.

BRIEF DESCRIPTION OF THE FIGURES

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
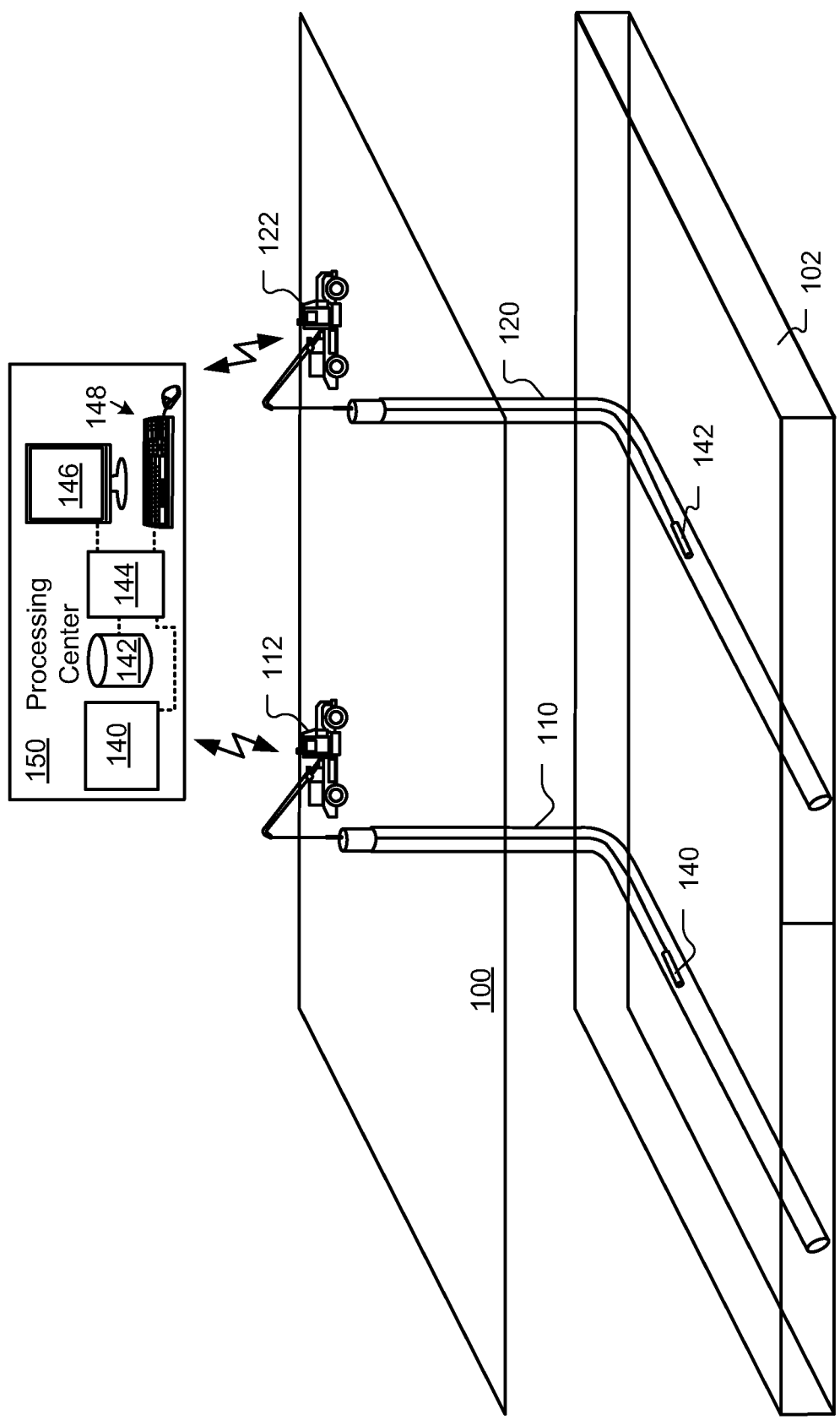
FIG. 1 illustrates an oilfield setting in which a multiscale digital rock modeling for reservoir simulation is carried out, according to some embodiments.

FIG. 1 illustrates an oilfield setting in which a multiscale digital rock modeling for reservoir simulation is carried out, according to some embodiments. In FIG. 1, wells 110 and 120 are nearly horizontal within the reservoir 102. On the surface 100, wireline logging truck 112 deploys a logging tool 140 in well 110. Similarly, wireline logging truck 122 is shown deploying a logging tool 142 in well 120. Although FIG. 1 illustrates nearly horizontal wells, those skilled in the art would realize that the described techniques could also be used in wells that are deviated or are vertical. The logging tools 140 and 142 can be, for example, borehole imaging tools, coring tools, fluid sampling tools, resistivity tools, nuclear tools, borehole seismic tools, sonic logging tools, and electromagnetic tools (including cross-well EM). Data from logging trucks 112 and 122 are transmitted to a processing center 150 which includes one or more central processing units 144 for carrying out the data processing procedures as described herein, as well as other processing. Processing center 150 also includes a storage system 142, communications and input/output modules 140, a user display 146 and a user input system 148. According to some embodiments, processing center 150 may be located in a location remote from the wellsites. Although not shown in FIG. 1, processing center 150 also receives many other types of data used in multiscale digital rock modeling, such as core analysis data and surface seismic data.

Digital rock models are used to develop conceptual workflows to perform multiscale simulations in heterogeneous rocks. Models range in size from pore (nm to micron) to borehole (mm to m) to interwell (10's to 100's of m) to full-field scale (10's to 100's of km). According to some embodiments, at each scale, petrophysical properties are calculated from digital rock models at the adjacent smaller scale. The petrophysical properties are then used to populate simulations at the next larger scale. This process, a form of upscaling, converts fine-scale models to coarse simulation grids.

According to some embodiments, at all scales, digital rock models employ multi-point statistics (MPS) and representative element volumes (REV's). MPS is a geostatistical modeling approach that creates simulations of spatial geological and reservoir property fields, conditioned to honor known results, such as those measured in wellbores or rock samples. REV's are the smallest volumes that can be modeled to capture rock heterogeneity, within specified limits of variance of the measured property, such as porosity or permeability.

Core samples for pore-scale modeling are strategically chosen using whole-core minipermeability grids and conventional CT scans. Pore-scale models employ tools such as transmitted laser scanning fluorescence microscopy, microCTscans, nanoCTscans, and focused ion beam-scanning electron microscopy to image pores in 3D. Mercury injection capillary pressure and/or nuclear magnetic resonance data, if available, provide independent ways to quantify or modify pore-size distributions. Analyses preferably show that an REV has been sampled for each petrophysical facies before segmentation into binary images should occur. MPS is used to create realistic models of arbitrary size and shape. Pore models are directly used for flow modeling, or converted to pore-network models, which are then used for flow modeling. Computed numerical SCAL (Special Core AnaLysis)

properties are validated with laboratory-derived data, and used to populate borehole-scale models.

According to some embodiments, borehole-scale models combine minipermeability grids and conventional CTscans of whole core with electrical borehole images to create 3D numerical pseudocores. SCAL properties determined from pore-scale models are distributed for each petrophysical facies in numerical pseudocores. Once again, analyses should show that an REV has been sampled before flow modeling occurs. Effective SCAL properties computed from various MPS realizations are used to populate interwell-scale models.

According to some embodiments, at the interwell scale, seismic attributes and variogram statistics from logging while drilling (LWD) are used to populate digital rock models. Effective properties computed from flow simulations at the interwell scale are used to populate full-field scale models. At the full-field scale, outcrop analogs, sequence stratigraphy, isopach maps, facies proportion curves, forward stratigraphic models, diagenetic models, basin-scale models, and MPS models are combined to improve flow simulations.

The approach described herein provides a better understanding of fluid-flow paths, fluid saturations, and recovery factors in hydrocarbon reservoirs. The workflow is suitable for any lithology, such as carbonates, sandstones, shales, coals, evaporites, and igneous or metamorphic rocks. At each scale, petrophysical properties are calculated, transferred up to the next scale, and used to populate coarser digital rock models.

Digital Rock Modeling.

According to some embodiments, a workflow is described for multiscale reservoir simulation, based upon digital rock models. Such models are built from cores, well logs, and seismic data. A goal is to create 3D models to digitally represent pore space and heterogeneous rock fabrics at all scales. This approach is valid in carbonates, sandstones, shales, and other lithologies, such as coals, evaporites, and igneous or metamorphic rocks. Fractures and faults can be included at various scales. Throughout many of the disclosed embodiments, recurring themes of digital rock modeling include multi-point statistics and representative element volumes.

Multi-point statistics (MPS) creates simulations of spatial geological and reservoir property fields. These conditional simulations use known results, such as those measured in wellbores or rock samples, as fixed or hard data that are absolutely honored during modeling. MPS uses 1D, 2D, or 3D "training images" as quantitative templates to model subsurface properties.

Representative element volumes (REV) provide a new application in reservoir modeling, based upon techniques used in groundwater hydrology. In summary, REV is the smallest volume that can be modeled to yield consistent results, within acceptable limits of variance of the modeled property, such as porosity or permeability. Using this approach, we can determine the smallest volume that needs to be modeled, run that flow model, and use the results to upscale to larger-scale simulations.

Pore-Scale Models.

A major goal of pore-scale digital rock modeling is to build 3D models that use multipoint statistics (MPS) to combine laser scanning fluorescence microscopy and other high-resolution techniques with microCTscans, with relatively large volumes imaged. According to some embodiments, one or more of the following tools and technologies are used:

1. Transmitted laser scanning fluorescence microscopy provides high-resolution (about 250 nm) 3D pore models to quantitatively capture microporosity. From this we compute pore-size distributions and simulated capillary pressure curves.

2. MicroCTscans use x-ray computed tomography (CT) on small samples (commonly 5 mm diameter core plugs) to detect pore bodies, with resolutions that are typically 1 to 5 microns in size. See, Knackstedt, M. A., Arms, C. H., Sakellariou, A., Senden, T. J., Sheppard, A. P., Sok, R. M., Pinczewski, W. V., and Bunn, G. F., 2004, Digital core laboratory: Properties of reservoir core derived from 3D images: SPE Preprint 87009, Presented at the Asia-Pacific Conference on Integrated Modeling for Asset Management, March 29-30. Software converts pore images into pore-network models, with resulting pore-body and pore-throat size distributions.

3. NanoCTscans use X-ray computed tomography (CT) on very small samples (commonly 60-micron sized core plugs) to detect pore bodies with resolutions that are typically about 50 nm to 60 nm in size. Software converts pore images into pore-network models, with resulting pore-body and pore-throat size distributions.

4. Focused ion beam-scanning electron microscopy (FIB-SEM) uses ion-beam thinning to create closely spaced, multiple 2D serial sections that are used to build 3D models of sub-micron scale pores. Resolution is typically on the 5 nm to 10 nm scale.

5. Mercury injection capillary pressure (MICP) involves progressive injection of mercury into a cleaned sample, commonly a plug, at steadily increasing pressures. See, Jennings, J. B., 1987, Capillary pressure techniques: Application to exploration and development geology: AAPG Bulletin, v. 71, p. 1196-1209; and Pittman, E. D., 1992: Relationship of porosity and permeability to various parameters derived from mercury injection-capillary pressure curves for sandstone: AAPG Bulletin, v. 76, p. 191-198. At each increased pressure, pore throats of a particular size are invaded by mercury. Pore-throat size distributions are generally shown as histograms, computed from MICP results. Note that MICP is not generally useful for pore throats larger than 100 microns because those throats are filled at very low injection pressures. The ideal pore-throat size for MICP is 0.1 to 100 microns.

6. Nuclear magnetic resonance (NMR) is based on the interaction of hydrogen nuclei (protons) with a magnetic field and pulses of radio-frequency signals. See, Coates, G. R., Xiao, L. and Prammer, M. G., 1999, NMR logging: Principles and applications: Halliburton Energy Services, USA, 234 p. The NMR transverse relaxation time distribution (T_2 distribution) relates to pore-size distribution in the rock. NMR results can be used to partition porosity into micro, meso, and macroporosity. See, Ramamoorthy, R., Boyd, A., Neville, T. J., Seleznev, N., Sun, H., Flaum, C., and Ma, J., 2008, A new workflow for petrophysical and textural evaluation of carbonate reservoirs: SPWLA Preprint, 49$^{th}$ Annual Logging Symposium, May 25-28, 15 p. Such results can be used to constrain pore-scale digital rock models.

7. Petrophysical facies are areas enclosed by minipermeability contours on core-slab faces. See, Bourke, L. T., 1993, Core permeability imaging: It's relevance to conventional core characterization and potential application to wireline measurement: Marine and Petroleum Geology, v. 10, p. 318-324; and Dehghani, K., Harris, P. M., Edwards, K. A., and Dees, W. T., 1999, Modeling a vuggy carbonate reservoir: AAPG Bulletin, v. 83, p. 19-42. Such regions commonly also have characteristic signatures on borehole-image logs, such as vugs, resistive patches, and conductive patches. See, Zhang 2009. Conductive patches, which correspond to regions of enhanced porosity and permeability, provide flow continuity between vugs. Such conductive or resistive patches have complex 3D shapes.

Workflows can be used to generate the following products. Pore models or pore-network models are used to compute, for representative element volumes (REV's) of individual petrophysical facies, the following results: porosities, permeabilities, capillary pressures, resistivity indices, relative permeabilities, water saturations, irreducible water saturations, residual oil saturations, recovery factors, and Archie cementation (m) and saturation (n) exponents. These numerical SCAL values, especially when validated with laboratory measurements, are used to populate borehole-scale models.

Borehole-Scale Models.

A major goal of borehole-scale digital rock modeling is to build flow models of heterogeneous carbonates using cores and borehole images. According to some embodiments, one or more of the following tools and technologies are used:

1. Conventional CTscans (about 1 mm to 2 mm spacing) are run and processed into 3D core images. These are used as MPS training images for numerical pseudocores.

2. Fullbore images are 360-degree views of the borehole wall generated by "filling in the gaps" between the pads of borehole image logs using MPS. See, Hurley, N. F., and Zhang, T., 2009, Method to generate fullbore images using borehole images and multi-point statistics: SPE preprint 120671-PP, presented at the Middle East Oil & Gas Show and Conference, Bahrain, 15-18 March. Rock heterogeneity is imaged in the near-borehole volume, and used as hard data to constrain MPS models of numerical cores.

3. Minipermeameters capture permeability variation on rock-slab surfaces, and are used to: (a) segment digital rock models into appropriate petrophysical facies, (b) validate those facies to absolute permeability values, and (c) identify subvolumes for more detailed sampling.

Workflows can be used to generate the following products: (1) Numerical pseudocores use conventional CTscans of cores, borehole image logs, and MPS to generate 3D models wherein every cell has its own porosity, permeability, capillary-pressure, and relative-permeability attributes. Such models quantitatively capture rock heterogeneity at the borehole scale. See, Zhang 2009; and (2) Eclipse flow models of numerical pseudocores are used to compute effective porosities, permeabilities, capillary pressures, resistivity indices, relative permeabilities, water saturations, irreducible water saturations, residual oil saturations, recovery factors, and Archie cementation (m) and saturation (n) exponents for REV's of key rock types.

Interwell-Scale Models.

A major goal of interwell-scale digital rock modeling is to use geostatistical tools, such as variogram statistics from LWD data, seismic attributes, and cross-well geophysics to capture interwell heterogeneity. Flow properties are provided by numerical pseudocores. According to some embodiments, one or more of the following tools and technologies are used:

1. Logging while drilling (LWD) data, especially neutron and density logs, are acquired for geosteering in horizontal wells. Outcrop studies show that cyclic variations (known as hole effect) occur in porosity and permeability transects along particular stratigraphic horizons. See, Pyrcz, M. J., and Deutsch, C. V., 2003, The whole story on the hole effect, in Searston, S. (ed.) Geostatistical Association of Australasia, Newsletter 18, May, 16 p, (hereinafter "Pyrcz 2003"); and Pranter, M. J., Hirstius, C. B., and Budd, D. A., 2005, Scales of lateral petrophysical heterogeneity in dolomite lithofacies as determined from outcrop analogs: Implications for 3-D reservoir modeling: AAPG Bulletin, v. 89, p. 645-662 (hereinafter "Pranter 2005"). If these cycles occur in reservoirs, variogram statistics from LWD data can be used to provide heterogeneous 'structure' to help populate models of the interwell region.

2. Numerical pseudocores are run for particular reservoir rock types as multiple realizations, or as models with selected porosity ranges. Numerical SCAL predicted from REV's of these models can be used to populate interwell-scale digital rock models.

3. Variograms are geostatistical tools used to depict spatial variance within groups of data, plotted as a function of distance between data points. When variograms are constructed from log data in horizontal wells, they can be used to map spatial variability at the interwell scale.

4. Seismic attributes, such as amplitude and acoustic impedance, commonly relate to porosity. Such attributes can be used as soft data to constrain MPS models of the interwell volume.

5. Cross-well geophysics, such as EM (electromagnetics) or seismic tomography, can be used to constrain property variations in the interwell volume.

Workflows can be used to generate the following products: Eclipse flow models of numerical pseudocores are used to populate interwell-scale flow models with effective porosities, permeabilities, capillary pressures, resistivity indices, relative permeabilities, water saturations, irreducible water saturations, residual oil saturations, recovery factors, and Archie cementation (m) and saturation (n) exponents for REV's of key rock types.

Full-Field Scale Models.

A major goal of full-field scale digital rock modeling is to build static models of the reservoir using cores, well logs, outcrop analogs, and sequence stratigraphy. Variogram-based geostatistical models, MPS, or forward stratigraphic models can be used to help populate interwell regions. According to some embodiments, one or more of the following tools and technologies are used:

1. Sequence stratigraphy is an interdisciplinary field of study that combines seismic, log, fossil, and outcrop data at local, regional and global scales. Basin-filling sedimentary deposits are interpreted within the framework of sedimentation and relative sea-level changes, caused by either tectonic or eustatic effects, or both. The approach is used to correlate strata and predict stratigraphy in relatively unknown areas. Sequence stratigraphy promotes an understanding of the evolution of basins, while it allows for the interpretation of potential source rocks and reservoir rocks in both frontier areas and more mature hydrocarbon provinces. Neal, J., Risch, D., and Vail, P., 1993, Sequence stratigraphy—A global theory for local success: Oilfield Review, January issue, p. 51-62.

2. Outcrops are bodies of rock exposed at the surface of the Earth. Outcrops with analogous lithologies and depositional environments to subsurface reservoirs can be used to help construct static models.

3. Forward stratigraphic models are used to construct realistic 3D stratal patterns based on hydraulic principles that apply to sediment transport. Such models can deal with subaqueous and eolian transport of siliciclastic material, and organic growth of carbonates and vegetation-related sediments, such as coals.

4. Isopach maps depict thickness of particular rock layers, or thickness of rocks with given petrophysical properties, such as porosity.

5. Facies proportion curves are generated from core descriptions and logs. They are used to estimate and constrain the relative amounts of each facies in a layer of a geomodel.

6. Seismic attributes, such as amplitude and acoustic impedance, commonly relate to porosity. Such attributes can be used as soft data to constrain MPS models of the interwell volume.

7. Diagenetic models are used to simulate cementation, compaction, and other diagenetic processes that accompany burial of sediment. Approaches range from reaction transport models, based upon thermodynamics and kinetics, to models based on texture, composition, and burial history of the original sediment.

8. Basin-scale models are used to model petroleum systems, commonly at scales much larger than oil fields. A petroleum system is defined as the combination of geologic elements and processes needed to generate and store hydrocarbons. Elements and processes include charge, trap, and timing of hydrocarbon generation, migration, and loss Multipoint Statistics.

Multipoint (or multiple-point) statistical methods (MPS) are a family of spatial statistical interpolation algorithms proposed in the 1990s used to generate conditional simulations of discrete variable fields, such as geological facies, through training images. See, Guardiano, F., and Srivastava, R. M. 1993, Multivariate geostatistics: Beyond bivariate moments: Geostatistics-Troia, A. Soares, Dordrecht, Netherlands, Kluwer Academic Publications, v. 1, p. 133-144 (hereinafter "Guardiano 1993"). MPS generates realistic models that can be constrained by different types of data. Unlike the conventional 2-point or variogram-based geostatistical approaches, MPS uses a training image to quantify complex depositional patterns that exist in studied reservoirs. These training patterns are then reproduced in the final MPS models with conditioning to local data collected from the reservoirs. Therefore, MPS allows modelers to use their prior geological interpretations as conceptual models (training images) in the reservoir modeling process and to evaluate the uncertainty associated with prior interpretations by using different training images.

In addition to categorical variables, MPS can deal with continuously variable training images, such as spatial distribution of porosity. Two families of MPS algorithms are available to handle these different types of training images: Snesim for categorical variables, and Filtersim for continuous variables. An efficient Snesim algorithm introduced the concept of a search tree to store all replicates of patterns found within a template over the training image. See, Strebelle, S. 2002, Conditional simulation of complex geological structures using multiple point statistics: Mathematical Geology, v. 34, p. 1-22. This makes Snesim code several orders of magnitude faster than the original algorithm proposed by Guardiano 1993. Filtersim applies a set of local filters to the training image, which can be either categorical or continuous, to group local patterns into pattern classes. See, Zhang, T. 2006, Filter-based training image pattern classification for spatial pattern simulation: Unpublished Ph.D. dissertation, Stanford University, Palo Alto, Calif. Pattern simulation then proceeds on the basis of that classification.

Snesim and Filtersim algorithms honor absolute, or "hard" constraints from data acquired in wells or outcrops, and other interpreted trend maps of the reservoir under study. Training images are the main driver of any MPS approach. An issue raised implicitly by current MPS algorithms is how to generate training images. Training images seek to model or reproduce real geological features and should as much as possible be derived from existing geologically meaningful images.

Representative Element Volumes.

Representative element volumes (REV) provide a new way to deal with heterogeneity and upscaling issues in reservoir modeling. See, Qi 2009. In summary, REV is the smallest volume that can be modeled to yield consistent results, within acceptable limits of variance of a modeled property, such as porosity or permeability. Using this approach, we can upscale rock properties from fine to coarse scales. This is accomplished by determining the smallest volume that needs to be modeled, run the flow model, and then using the results in the next larger-scale simulations. Once the REV has been modeled, larger volumes need not be modeled because heterogeneity for the particular rock type at that scale has been captured.

The concept of REV was discussed in 1972. See, Bear, J., 1972, Dynamics of fluids in porous media: Elsevier, N.Y., 746 p (hereinafter "Bear 1972"). $\Delta U_i$ is defined as a volume in a porous media, with a centroid of P. $\Delta U_i$ is considered to be much larger than a single pore or grain. $\Delta U_v$ is the volume of void space, and $n_i$ is the ratio of void space to volume, i.e., the fractional porosity. At large values of $\Delta U_i$, there are minimal fluctuations of porosity as a function of volume. However, as volume decreases, fluctuations in porosity increase, especially as AU, approaches the size of a single pore, which has fractional porosity of 1. If the centroid P happens to lie in a grain, porosity is 0 when $\Delta U_i$=0. The value $\Delta U_o$ is defined as the REV, below which fluctuations of porosity are significant, and above which fluctuations of porosity are minimal. In brief, the dimensions of $\Delta U_o$ are sufficient so that "the effect of adding or subtracting one or several pores has no significant influence on the value of n." See, Bear 1972.

Using the REV approach, the porous medium is replaced by "a fictitious continuum: a structureless substance, to any point of which we can assign kinematic and dynamic variables and parameters that are continuous functions of the spatial coordinates of the point and of time." See, Bear 1972. Note that the REV for porosity may differ from the REV for permeability or other parameters. Also, the REV for static vs. dynamic properties may vary. In practice, the best method is to use the largest REV determined for various parameters.

According to some embodiments, REV is determined for a rock property such as porosity. According to some embodiments, a large volume can be modeled, subsampled, and the variance in porosity can be computed as a function of subsample volume. This can be done at any scale, ranging from pores to boreholes to interwell volumes.

Within limitations of available computing power, multipoint statistics (MPS) can generate models of any size and shape. Because of this, MPS models can be used to help compute REV's. For example a pore-scale modeled volume can be 600×600 microns in area, and 150 microns in thickness. Smaller sub-volumes, for example, 10, 50, or 150 micron cubes, could be extracted from the modeled volume, and their porosities could be determined. At the interwell scale, smaller sub-volumes, for example, 1, 10, and 20 m³, could be extracted from the modeled volume, and their porosities could be determined. All sub-volumes, regardless of scale, should be independent, non-overlapping volumes. If porosity variance is less than a chosen cutoff, for example +/−5%, then that volume can be used as the REV. For the purpose of flow modeling, the REV is sufficient to yield representative results.

The generalized approach for REV determination for any rock property is: (1) Model a large block with rock properties of interest; (2) Randomly select a subsample of a given small size within the block; (3) Randomly select another non-overlapping subsample of the same size; (4) Repeat this process many times; (5) Increase subsample size, and sample many similar objects; (6) Plot rock property vs. subsample size, to see how variance from the sample mean decreases as a function of subsample size; and (7) When variance is within acceptable limits (for example, ±5%), this is the REV for the rock property under study.

A step-by-step procedure will now be provided to create digital rock models and upscale them from pore to borehole to interwell to full-field scale, according to some embodiments. Variations to this procedure may be made, according to other embodiments, for example, depending on the available datasets.

Figure 2A:
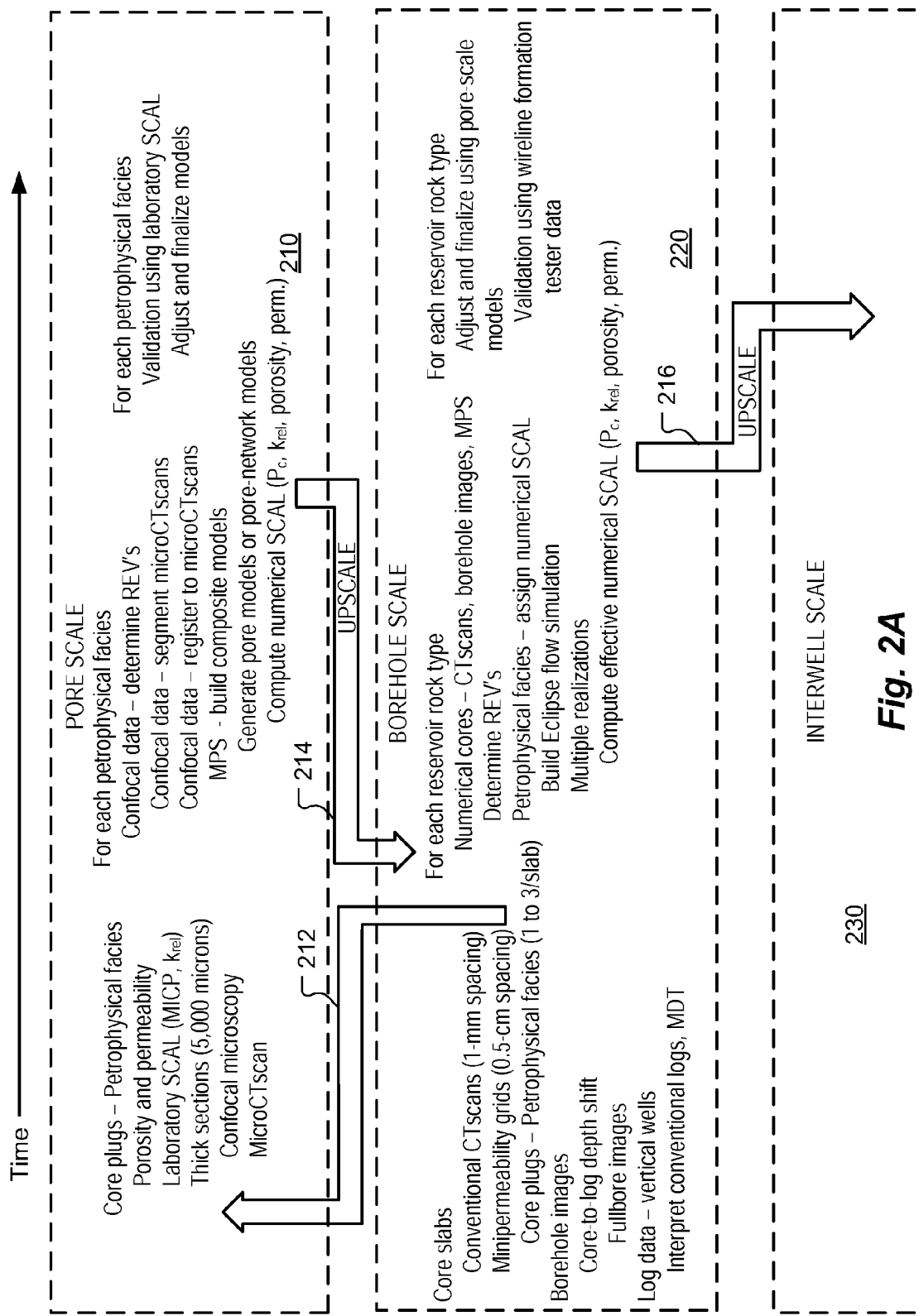
FIGS. 2A-B is block diagram showing recommended procedures for multiscale reservoir simulation according to some embodiments.
Figure 2B:
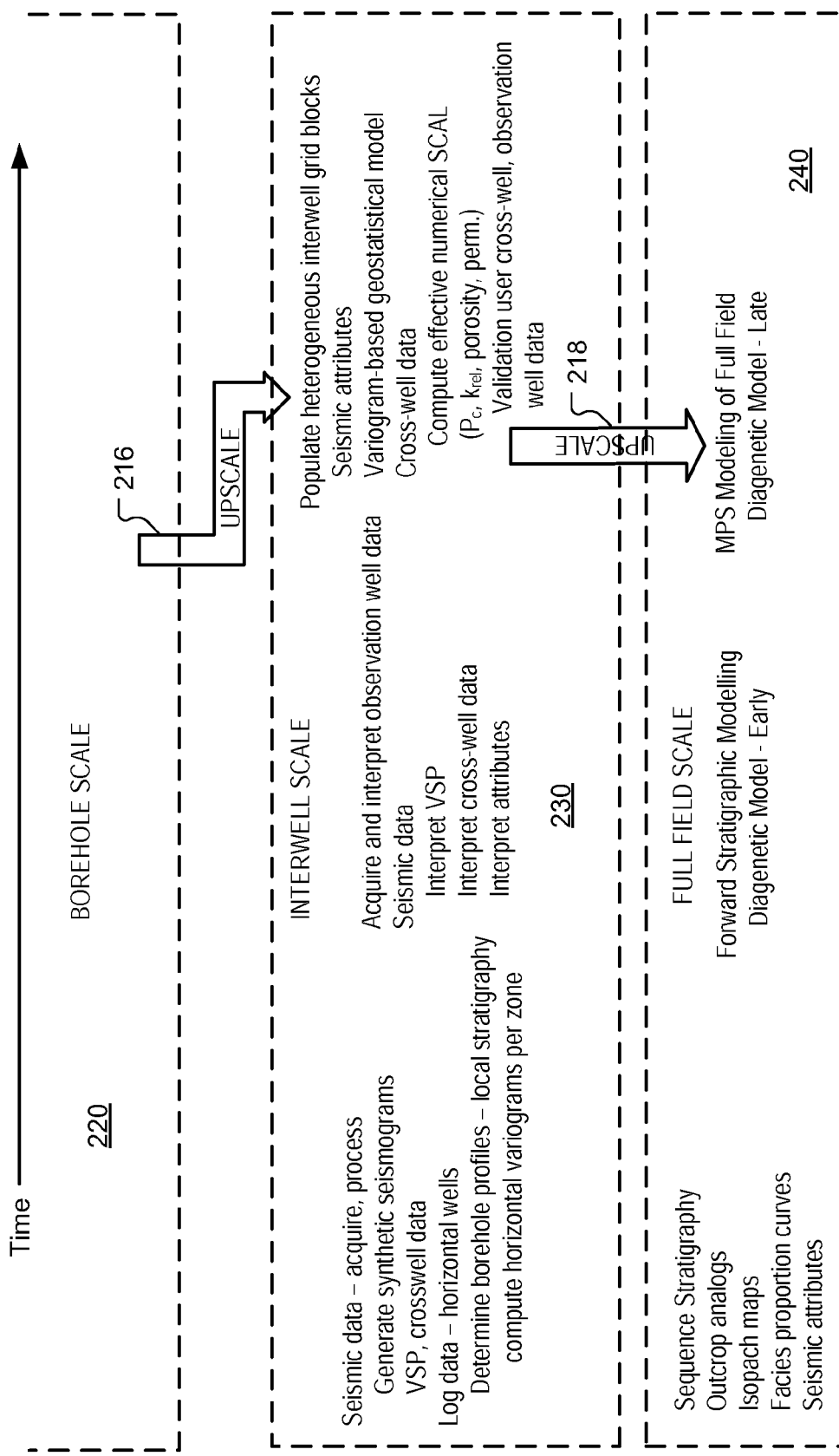

FIGS. 2A-B is block diagram showing recommended procedures for multiscale reservoir simulation according to some embodiments. The block diagram shows a time sequence of steps (from left to right) used to build laboratory- and field-validated digital rock models, and upscale results from the pore to the borehole to the interwell to the full-field scales according to some embodiments. The pore-scale steps 210, borehole-scale steps 220, interwell-scale steps 230 and full-field-scale steps 240 are carried out as shown. Note as indicated by arrow 212, preferably the minipermeability and conventional CTscan data is obtained to aid in defining the petrophysical facies at the core-plug scale, and used to help determine where to drill the core plugs. The computed numerical SCAL ($P_c$, $k_{rel}$, porosity and permeability) are used to upscale from pore scale to borehole scale, as indicated by arrow 214. As indicated by arrow 216, the computed numerical SCAL ($P_c$, $k_{rel}$, porosity and permeability) is again used to upscale from borehole scale to interwell scale. Finally, as indicted by arrow 218, the computed numerical SCAL ($P_c$, $k_{rel}$, porosity and permeability) from the interwell scale is used to upscale to full field scale in the MPS modeling of the full field.

Figure 3:
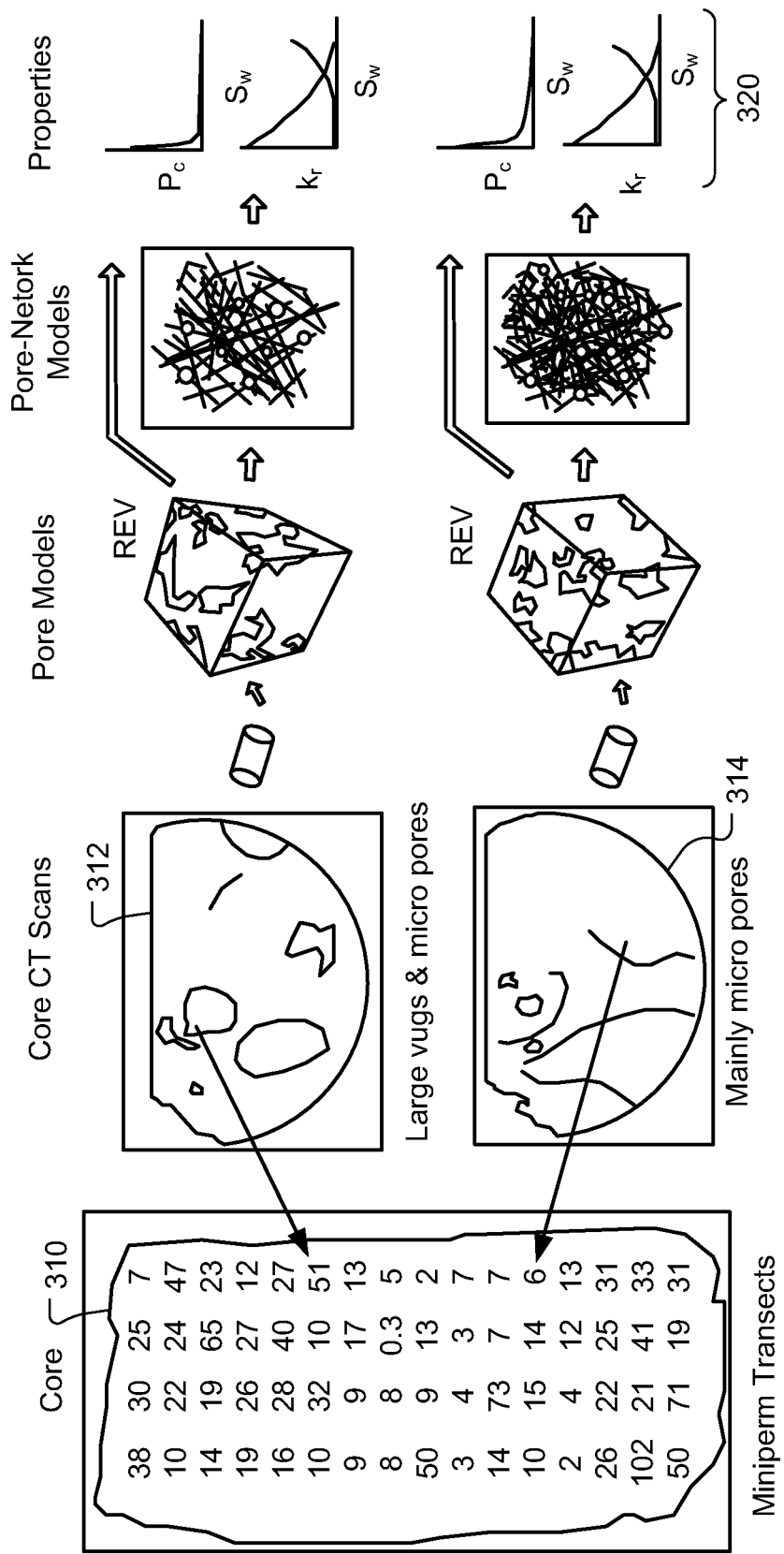
FIG. 3 is a block diagram showing a workflow with pore-scale digital rock models, according to some embodiment.

FIG. 3 is a block diagram showing a workflow with pore-scale digital rock models, according to some embodiments. In practice, whole cores are imaged with conventional CTscans, using closely spaced slices (about 1 mm to 2 mm). Minipermeability grids (about 0.5 cm to 1.0 cm) on slab faces allow us to segment cores into sub-regions, validated with lab-measured permeabilities. Strategically chosen core plugs, sampled within the context of CTscan results 312 and 314 and minipermeability results 310, represent petrophysical facies. Submicron-sized pores of each petrophysical facies are imaged for their corresponding REVs using laser scanning fluorescence (confocal) microscopy and microCTscans, and other high-resolution techniques, which can be combined using MPS. Numerical SCAL 320, computed from pore models or pore-network models, carry us to the next larger scale, i.e., the borehole.

Figure 4:
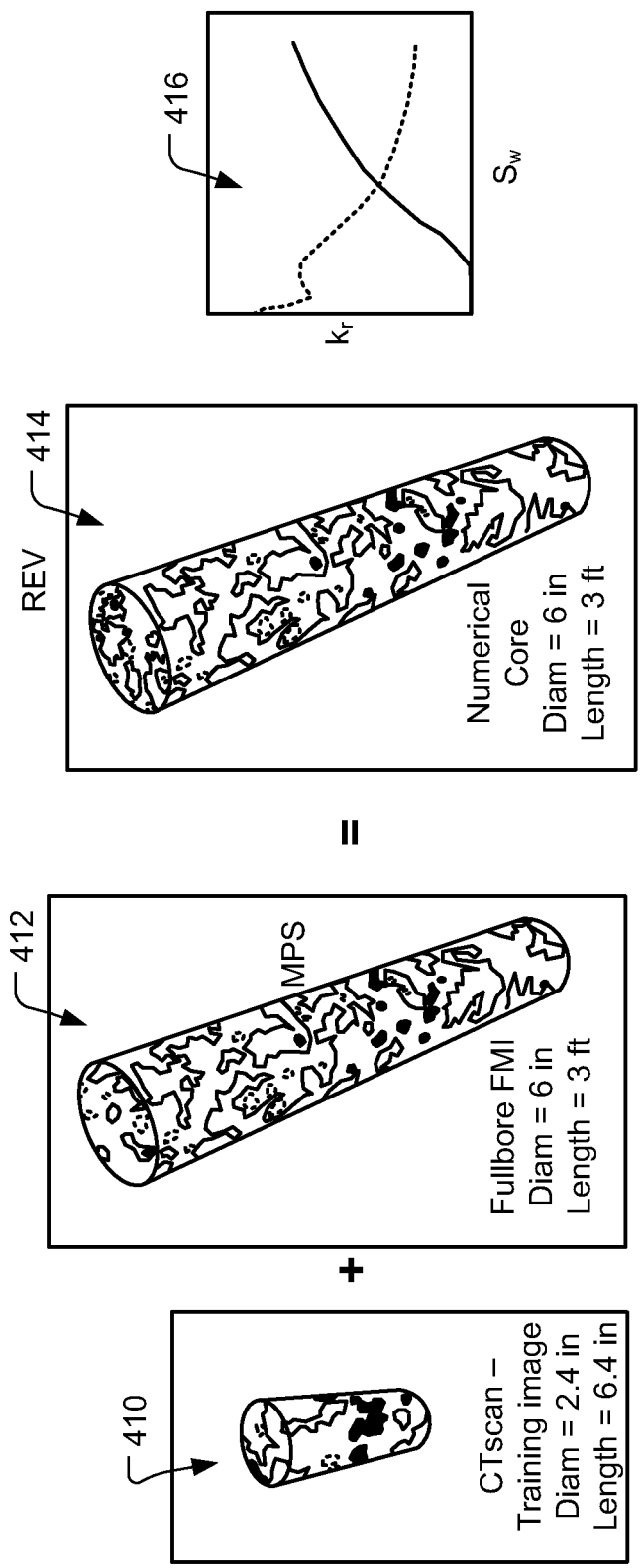
FIG. 4 is a block diagram showing a workflow with borehole-scale digital rock models, according to some embodiments.

FIG. 4 is a block diagram showing a workflow with borehole-scale digital rock models, according to some embodiments. Numerical pseudocores 414 are created using discrete-variable MPS algorithms. Integer values are assigned to each petrophysical facies, for example, dense rock matrix (0), vugs (1), resistive patches (2), and conductive patches (3). Conventional CTscans 410 of whole-core rock samples are used as MPS training images, i.e., they are the quantitative templates used to guide the modeling of 3D textures at the borehole scale. Fullbore images 412, derived from FMI or other borehole image logs, surround numerical pseudocores with cylindrical envelopes that condition the models. Segmentation of the conventional CTscans and fullbore images into discrete petrophysical facies is done using contoured, gridded minipermeability data, according to some embodiments. Each numerical pseudocore 414 preferably absolutely honors the heterogeneity of the digital rock samples and the fullbore image data. Subvolumes can be sampled to confirm that REV's are being modeled for a given numerical pseudocore.

Numerical pseudocores are gridded into models used for fluid-flow simulation. For each petrophysical facies, porosity, permeability, capillary pressure, and relative permeability curves are provided by pore-scale numerical SCAL. Bulk, or system-scale, or effective properties are computed from flow-model results for the numerical pseudocores: porosities, permeabilities, capillary pressures, resistivity indices, relative permeabilities, water saturations, irreducible water saturations, residual oil saturations, recovery factors, and Archie cementation (m) and saturation (n) exponents 416. These properties are used to populate digital rock models at the next scale, i.e., interwell grid blocks.

Figure 5:
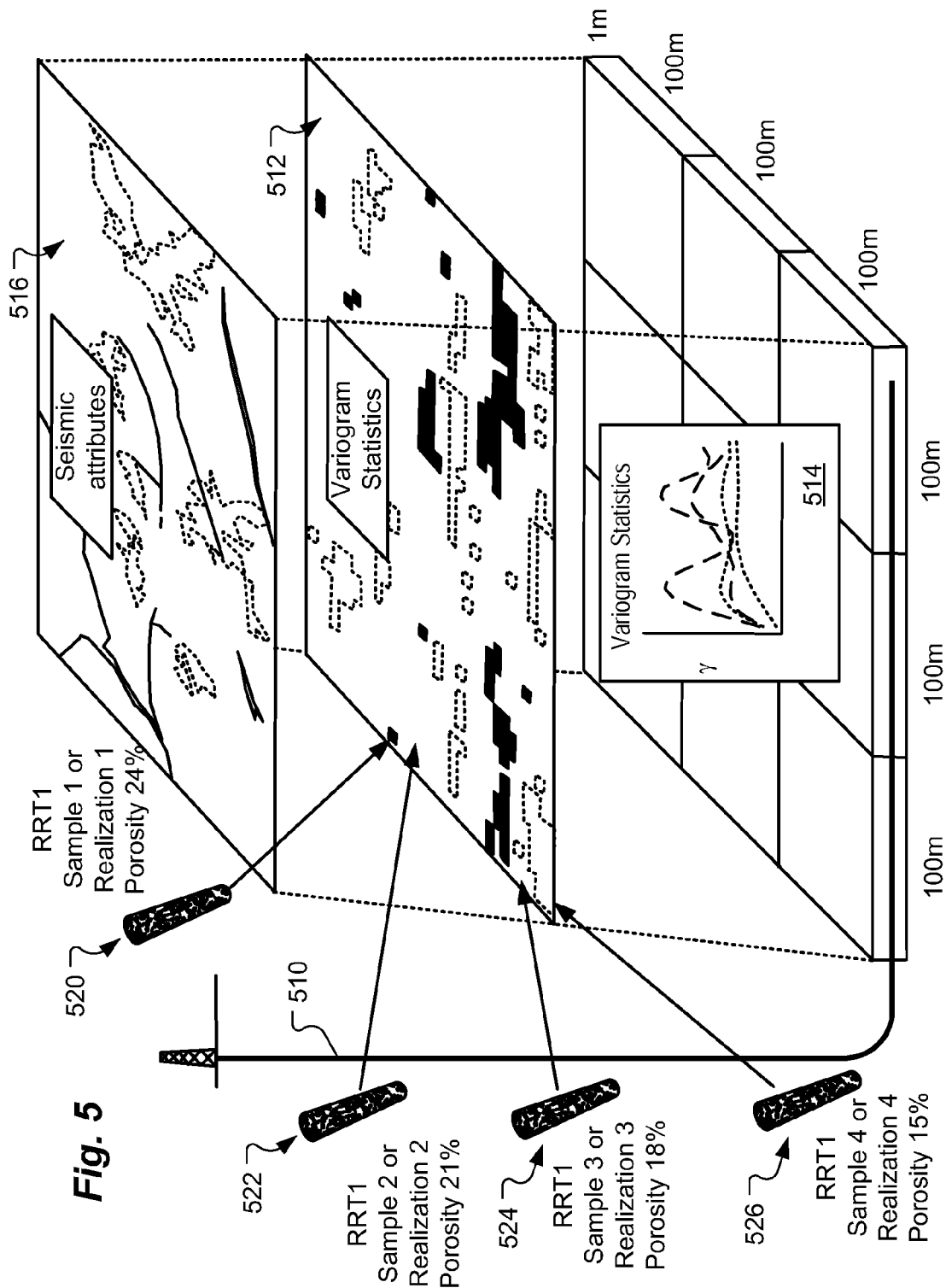
FIG. 5 is a diagram showing a workflow with interwell-scale digital rock models, according to some embodiments.

FIG. 5 is a diagram showing a workflow with interwell-scale digital rock models, according to some embodiments. Variogram statistics 512 and 514 from horizontal wells, such as well 510, drilled within particular rock layers, can be combined with seismic attributes 516 and cross-well geophysics to capture heterogeneity at the interwell scale. Multiple realizations of digital rock models, or multiple samples at various porosity values 520, 522, 524 and 526, are used to populate interwell volumes with borehole-scale numerical SCAL properties.

Figure 6:
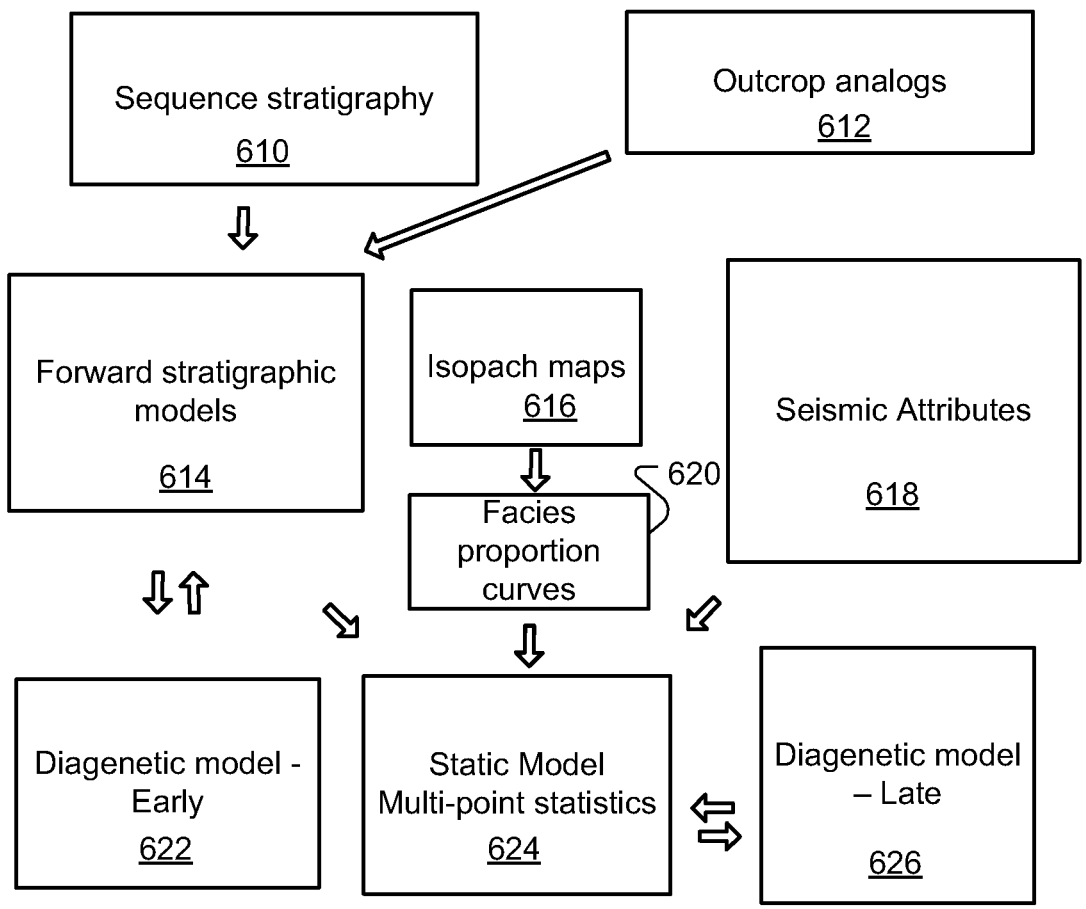
FIG. 6 is a block diagram showing a workflow for full-field simulation, according to some embodiments.

FIG. 6 is a block diagram showing a workflow for full-field simulation, according to some embodiments. The full-field simulation uses forward stratigraphic modeling 614, isopach maps 616, facies proportion curves 620, and multi-point statistics 624 to honor well data. The forward stratigraphic model 614 is used as a training image or facies probability cube for multi-point statistics 624 modeling. Sequence stratigraphy 610, outcrop analogs 612, and seismic attributes 618 are used to develop the static model. Diagenetic models are used to modify petrophysical properties early 622 and late 626 during deposition and burial.

Figure 7:
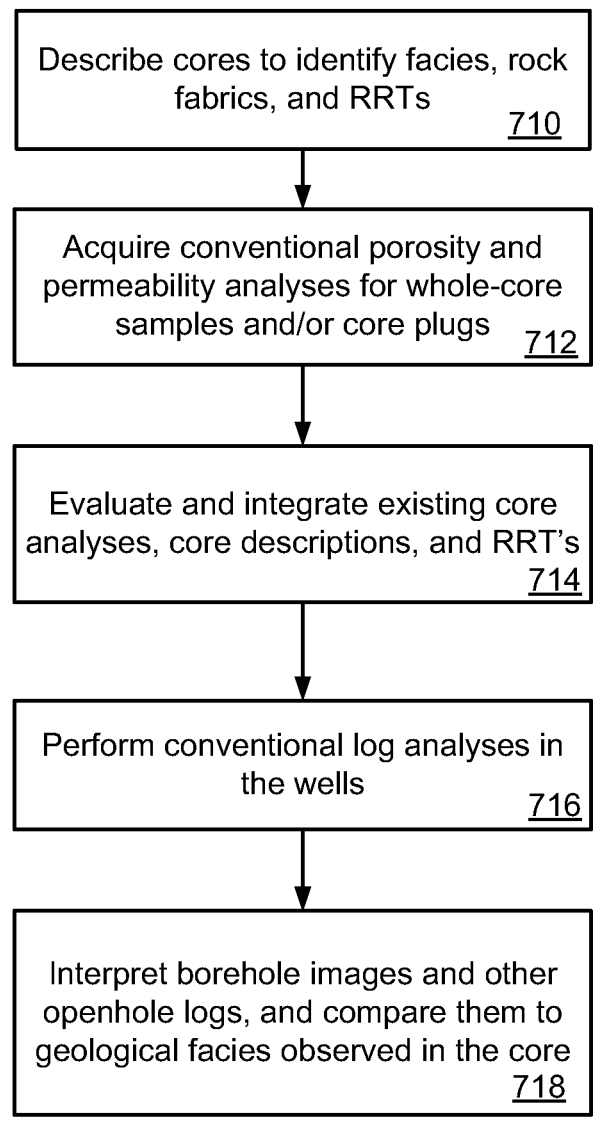
FIG. 7 is a flow chart showing preliminary steps to be carried out prior to a multiscale reservoir simulation, according to some embodiments.

FIG. 7 is a flow chart showing preliminary steps to be carried out prior to a multiscale reservoir simulation, according to some embodiments. A definition of Reservoir Rock Types (RRT's) is preferably performed along with conventional log analyses. In step 710, cores are described to identify facies, rock fabrics, and RRT's. A given field will generally have 5-10 RRT's. This exercise works best if RRT's are based on lithofacies combined with petrophysical properties (for example, porosity, permeability, MICP, NMR). In step 712, conventional porosity and permeability analyses are acquired for whole-core samples and/or core plugs. In step 714, existing core analyses, core descriptions, and RRT's are evaluated and integrated. In step 716, conventional log analyses in the wells are performed. In step 718, interpret borehole images and other openhole logs, and compare them to geological facies observed in the core. If the correlation is good, neural networks can be used to distribute facies along the length of the borehole(s).

Borehole- and Pore-Scale Modeling.

Figure 8A:
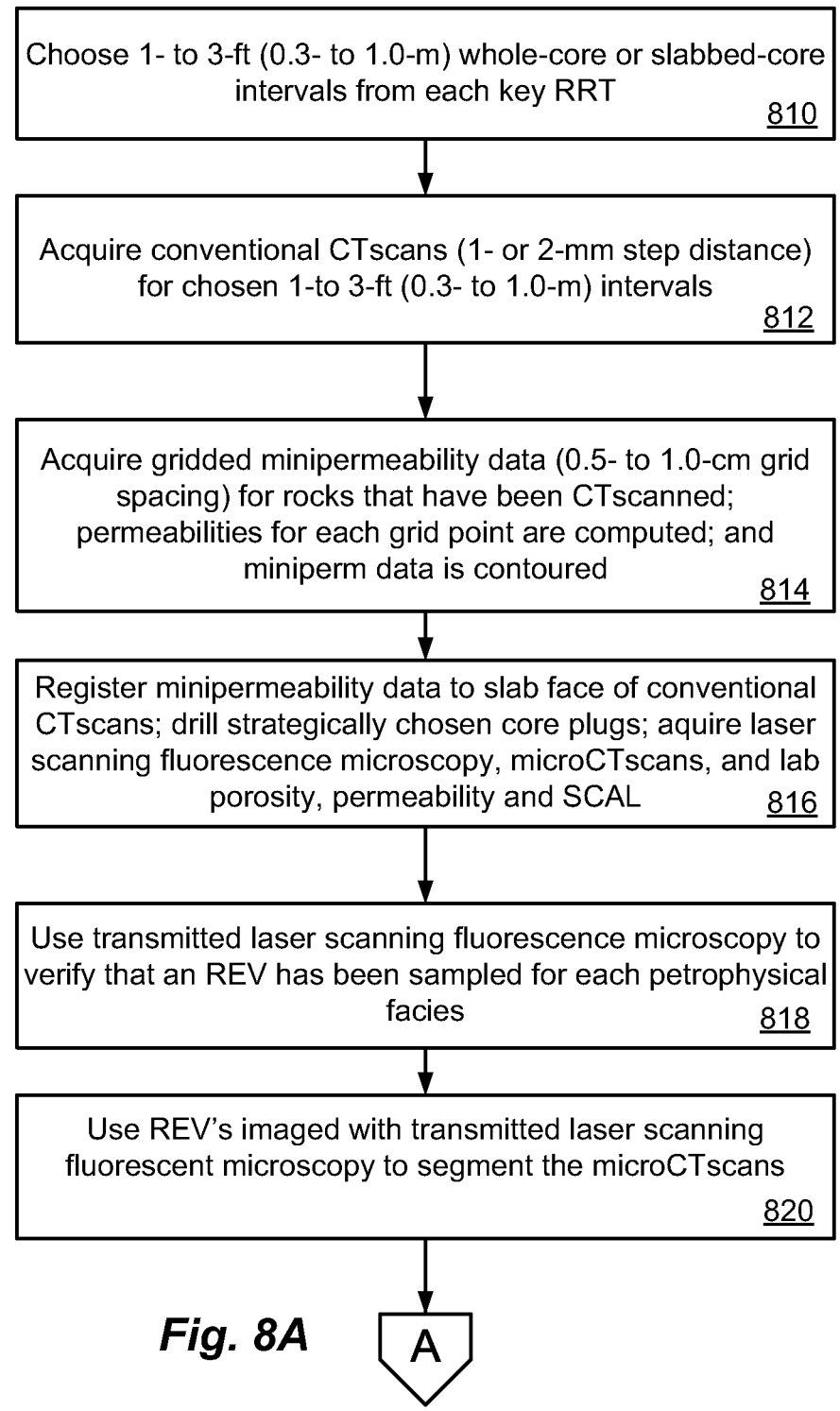
FIGS. 8A-B are a flow chart showing steps in performing an advanced digital core analysis, in the form of numerical pseudocores and flow simulation, according to some embodiments.
Figure 8B:
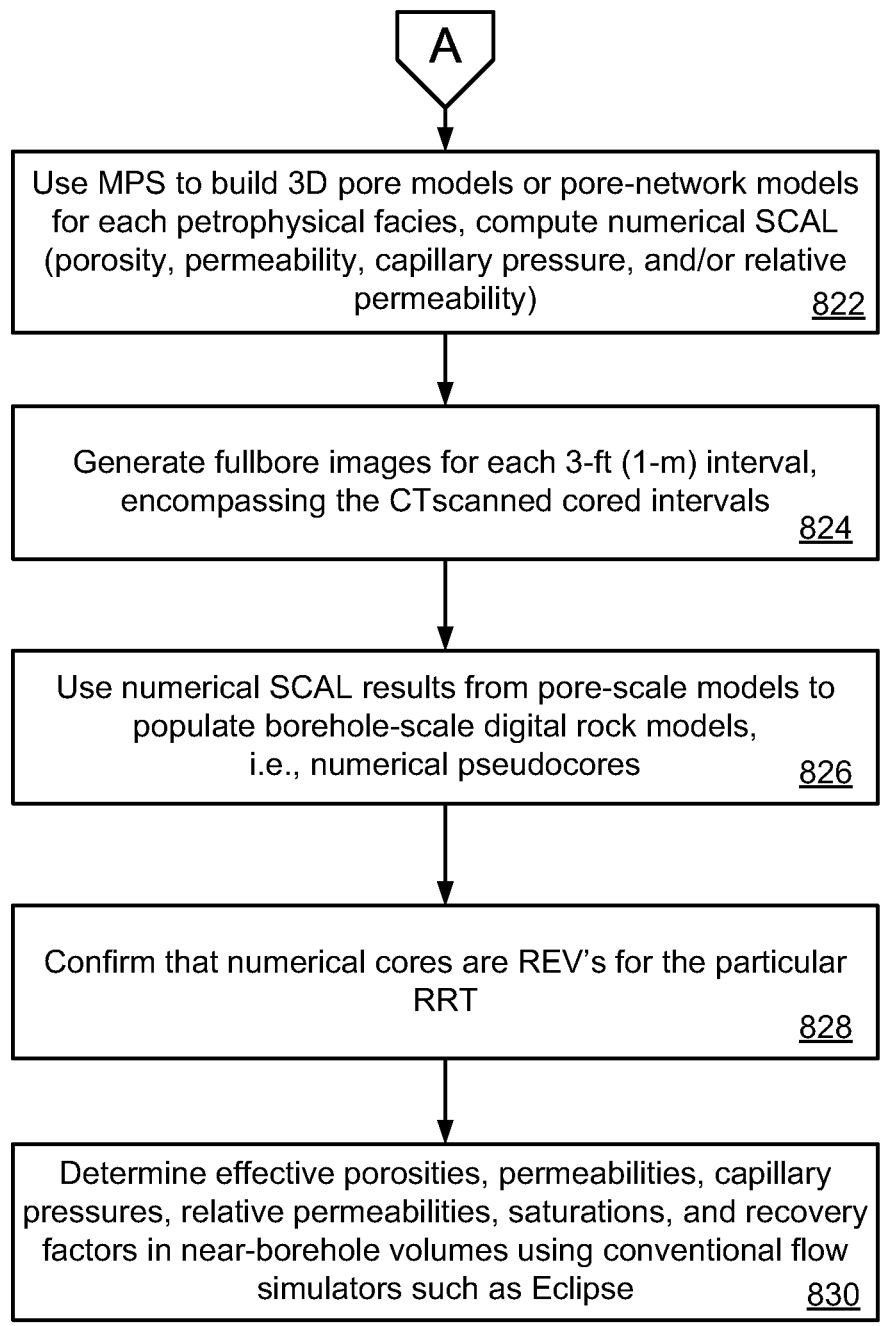

FIGS. 8A-B are a flow chart showing steps in performing an advanced digital core analysis, in the form of numerical pseudocores and flow simulation, according to some embodiments. Reference is also made to the workflows shown in and described with respect to FIGS. 3 and 4.

In step 810, 1- to 3-ft (0.3- to 1.0-m) whole-core or slabbed-core intervals are choosen from each key RRT. Preferably, these intervals will be from well(s) with electrical borehole image logs (for example, FMI). Added benefits will come from wells with elemental spectroscopy logs (for example, ECS) and nuclear magnetic resonance logs (for example, CMR). These logs will be useful for mineralogy and porosity partitioning (macro, meso, microporosity), respectively. In step 812, conventional CTscans (1- or 2-mm step distance) are acquired for chosen 1- to 3-ft (0.3- to 1.0-m) intervals. In step 814, gridded minipermeability data (0.5- to 1.0-cm grid spacing) are acquired for rocks that have been CTscanned. The minipermeability device is calibrated to core plugs that have a wide range of permeabilities (for example, 0.1 md to 3,000 md). Calibrated absolute permeabilities are computed for each grid point. The minipermeability data is contoured. This step 814 will lead to: (a) proper segmentation of the whole-core CTscan and fullbore images, (b) validation to lab-measured permeabilities, and (c) identification of subvolumes for more detailed sampling.

In step 816, minipermeability data is registered to slab face of conventional CTscans. Use this combination to choose subsample areas suitable for milling or core plugging. Drill strategically chosen core plugs of distinctive petrophysical facies, and submit them for (a) thin (30 micron) or thick (5,000 micron) sections for transmitted laser scanning fluorescence microscopy and microCTscan, and (b) laboratory porosity, permeability, and SCAL (MICP, $k_{rel}$). Preferably, these data will be acquired at reservoir conditions. Such results will be used as end-point rock properties for petrophysical facies. According to some preferred embodiments, this is an important part of the laboratory validation step.

Thin or thick sections should be vacuum-pressure impregnated with fluorescent-dyed (Rhodamine B) epoxy. In step 818, transmitted laser scanning fluorescence microscopy is used to verify that an REV has been sampled for each petrophysical facies. In step 820, REV's imaged with transmitted laser scanning fluorescence microscopy are used to segment the microCTscans. This step is especially preferred if significant amounts of porosity lie below the resolution threshold of the microCTscanning device.

In step 822, MPS is used to build 3D pore-network models. Such models are one approach that can be used to compute numerical SCAL (porosities, permeabilities, capillary pressures, resistivity indices, relative permeabilities, water saturations, irreducible water saturations, residual oil saturations, recovery factors, and Archie cementation (m) and saturation (n) exponents), which will be used to populate larger-scale numerical pseudocores. If thick sections are made, run microCTscan with resolution of 5 microns or better. MPS uses confocal scans as training images and microCTscans as hard data to build composite "total porosity" models for each petrophysical facies. Numerical SCAL can be directly computed from such pore models, using lattice-Boltzmann or other flow simulators, or from pore-network models derived from the pore models.

In step 824, if borehole image logs are available, generate fullbore images for each 3-ft (1-m) interval, encompassing the CTscanned cored intervals. Create 3D numerical pseudocores from borehole images and CTscans using MPS. In step 826, numerical SCAL results from pore-scale models are used to populate borehole-scale digital rock models, i.e., numerical pseudocores. In step 828, a confirmation is made that numerical pseudocores are REV's for the particular RRT.

In step 830, determine effective porosities, permeabilities, capillary pressures, resistivity indices, relative permeabilities, water saturations, irreducible water saturations, residual oil saturations, recovery factors, and Archie cementation (m) and saturation (n) exponents in near-borehole volumes using conventional flow simulators such as Eclipse. If possible, validate computed SCAL determined from numerical pseudocores with whole-core SCAL run in the lab. Run multiple realizations, or run realizations for different porosity ranges. Integrate reservoir pressure, fluid properties, and other field data to run flow simulations.

Interwell-Scale Modeling.

Figure 9:
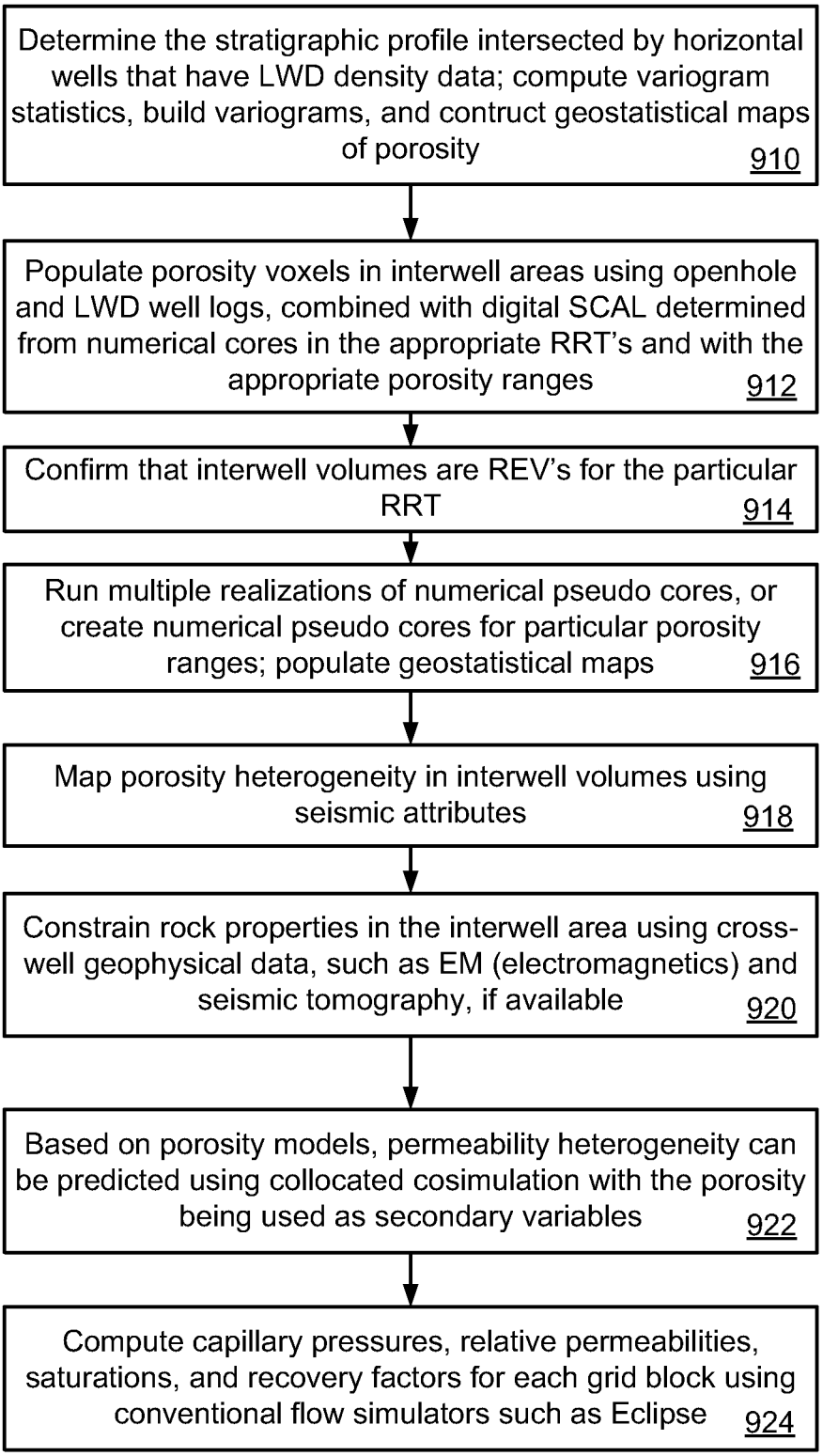
FIG. 9 is a flow chart showing steps used to distribute facies and construct the interwell-scale model, according to some embodiments.

FIG. 9 is a flow chart showing steps used to distribute facies and construct the interwell-scale model, according to some embodiments. Reference is also made to the workflow shown in and described with respect to FIG. 5.

In step 910, the stratigraphic profile intersected by horizontal wells that have LWD density data is determined. Variogram statistics are computed for intervals where the well stayed within the same stratigraphic layer. Look for the hole effect, an indication of spatial cyclicity (See, Pyrcz 2003; and Pranter 2005), build variograms, and construct geostatistical maps of porosity for the interwell area. In step 912, porosity voxels are populated in interwell areas using openhole and LWD well logs, combined with digital SCAL determined from numerical pseudocores in the appropriate RRT's and with the appropriate porosity ranges. In step 914 a confirmation is made that interwell volumes are REV's for the particular RRT. In step 916, multiple realizations of numerical pseudocores are run, or numerical pseudocores are created for particular porosity ranges. Geostatistical maps are populated with numerical SCAL data from numerical pseudocores.

In step 918, porosity heterogeneity is mapped in interwell volumes using seismic attributes, if available. Seismic data is used to provide input to 3D facies distribution models. If seismic attributes correlate to porosity, use this as soft data to constrain geostatistical maps of interwell regions. In step 920, rock properties are constrained in the interwell area using cross-well geophysical data, such as EM (electromagnetics) and seismic tomography, if available. In step 922, based on porosity models, permeability heterogeneity can be predicted using collocated cosimulation with the porosity being used as secondary variables. In step 924, effective porosities, permeabilities, capillary pressures, resistivity indices, relative permeabilities, water saturations, irreducible water saturations, residual oil saturations, recovery factors, and Archie cementation (m) and saturation (n) exponents are computed for each interwell volume using conventional flow simulators such as Eclipse.

Full-Field Scale Modeling.

Figure 10A:
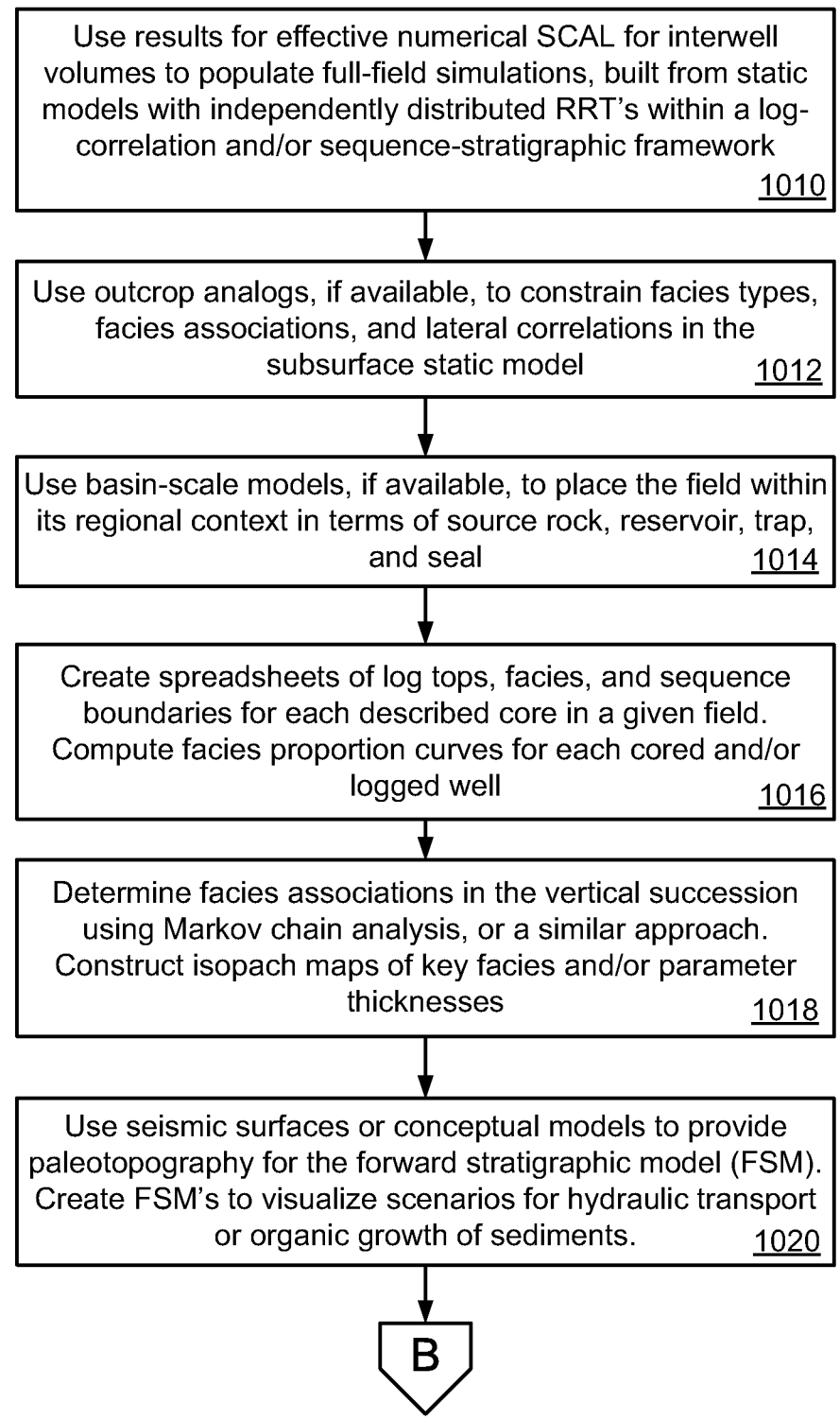
FIGS. 10A-B illustrate a flow chart showing recommended steps to upscale from interwell to full-field simulations, according to some embodiments.
Figure 10B:
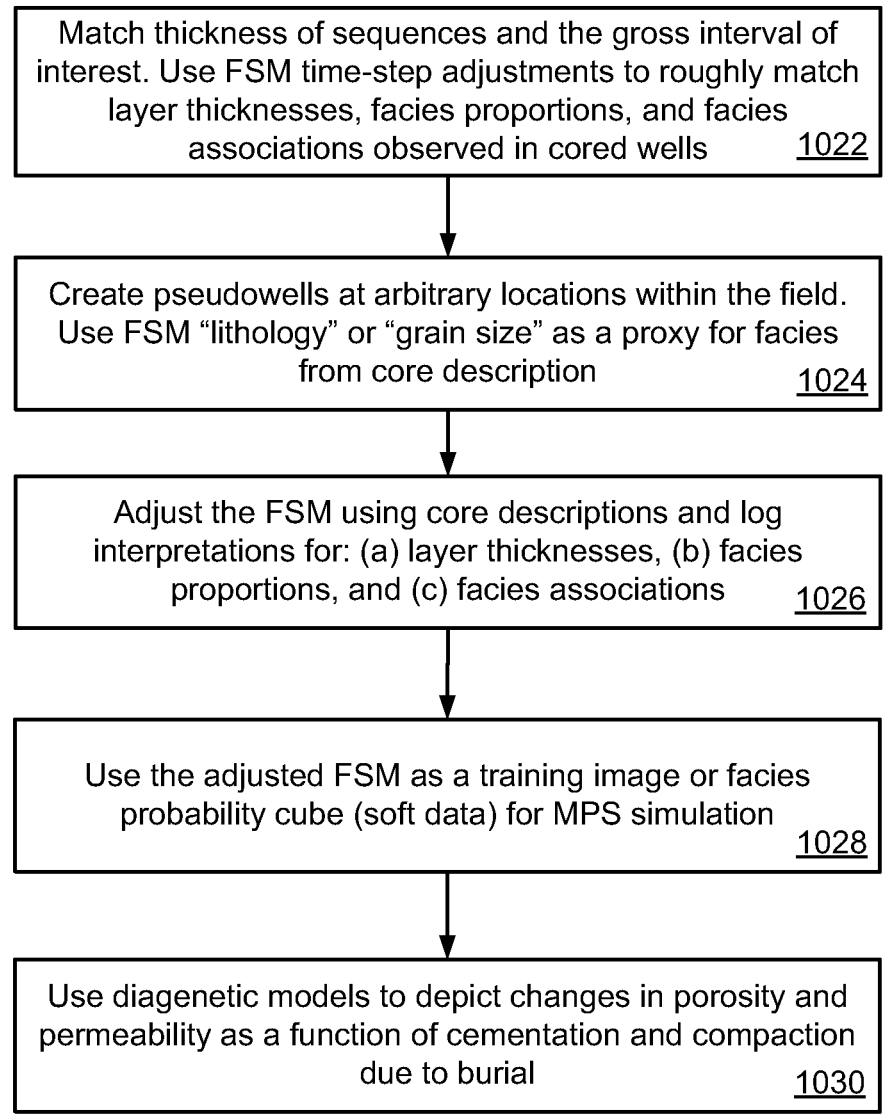

FIGS. 10A-B illustrate a flow chart showing recommended steps to upscale from interwell volumes to full-field simulations, according to some embodiments. Reference is made to the work flow shown in and described with respect to FIG. 6.

In step 1010, results for effective numerical SCAL are used for interwell volumes to populate full-field simulations, built from static models with independently distributed RRT's within a log-correlation and/or sequence-stratigraphic framework. In step 1012, outcrop analogs, if available, are used to constrain facies types, facies associations, and lateral correlations in the subsurface static model. These outcrop analogs can be used to assist MPS modeling in generating training images. In step 1014, basin-scale models, if available, are used to place the field within its regional context in terms of source rock, reservoir, trap, and seal. Burial history, and its effect on diagenesis are important considerations.

In step 1016, spreadsheets of log tops, facies, and sequence boundaries are created for each described core and/or logged well in a given field. Facies proportion curves are computed for each cored and/or logged well. In step 1018, facies associations in the vertical succession are determined using Markov chain analysis, or a similar approach. Isopach maps of key facies and/or parameter thicknesses are constructed. In step 1020 seismic surfaces or conceptual models are used to provide paleotopography for the forward stratigraphic model (FSM). FSM's are created to visualize scenarios for hydraulic transport or organic growth of sediments. In step 1022, thickness of sequences and the gross interval of interest are matched. FSM time-step adjustments are used to roughly match layer thicknesses, facies proportions, and facies associations observed in cored wells.

In step 1024, pseudowells are created at arbitrary locations within the field. FSM "lithology" or "grain size" are used as a proxy for facies from core description. In step 1026, the FSM are adjusted using core descriptions and log interpretations for: (a) layer thicknesses, (b) facies proportions, and (c) facies associations. In step 1028 the adjusted FSM are used as a training image or facies probability cube (soft data) for MPS simulation. If the FSM is used as a facies probability cube, MPS training images could be layered models, with comparable thicknesses, facies proportions, and facies associations to described cores and logs in the wells. If necessary, due to variable strata architecture, different training images can be used in different regions of the field. In step 1030, diagenetic models are used to depict changes in porosity and permeability as a function of cementation and compaction due to burial.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A computer-implemented method for upscaling with a processing system, borehole-scale digital rock modeling data representing reservoir rock, the method comprising:
    using the processing system to upscale the borehole-scale digital rock modeling data to interwell-scale digital rock modeling data based at least in part on combining the borehole-scale digital rock modeling data with interwell-scale source data to generate interwell-scale digital rock modeling data that at least partially captures heterogeneity at an interwell scale;
    using the processing system to upscale the generated interwell-scale digital rock modeling to generate full-field-scale digital rock modeling data wherein the borehole-scale digital rock modeling data has been at least partially upscaled from pore-scale digital rock modeling data; and
    wherein the upscaling to generate full-field-scale digital rock modeling data is based at least in part on computed values at an interwell-scale from the interwell-scale digital rock modeling data.

2. The computer-implemented method according to claim 1 further comprising identifying a plurality of reservoir rock types in at least the borehole-scale digital rock modeling data.

3. The computer-implemented method according to claim 1 wherein the interwell-scale source data is gathered using one or more techniques selected from a group consisting of: logging while drilling data from a non-vertical well, crosswell geophysical measurements, and seismic measurements.

4. The computer-implemented method according to claim 3 wherein the interwell-scale source data is gathered using logging while drilling data from a non-vertical well.

5. The computer-implemented method according to claim 3 wherein the interwell-scale source data includes computed variogram statistics.

6. The computer-implemented method according to claim 1 wherein the borehole-scale digital rock modeling data used to generate the interwell-scale digital rock modeling data includes computed values at a borehole-scale, of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

7. The computer-implemented method according to claim 1 wherein the digital rock modeling data is three-dimensional data.

8. The computer-implemented method according to claim 1 wherein the digital rock modeling data includes results of multi-point statistics.

9. The computer-implemented method according to claim 1 wherein the digital rock modeling data includes a plurality of representative element volumes.

10. The computer-implemented method according to claim 1 wherein the upscaling from pore-scale digital rock modeling data is based at least in part on computed values at a pore scale, of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

11. The computer-implemented method according to claim 1 wherein the pore-scale digital rock modeling data includes pore geometry that is quantified using one or more techniques selected from a group consisting of: transmitted laser scanning fluorescence microscopy, microCTscans, nanoCTscans, focused ion beam-scanning electron microscopy, mercury injection capillary pressure, and/or nuclear magnetic resonance.

12. The computer-implemented method according to claim 1 wherein the pore-scale digital rock modeling data is generated at least in part using strategically selected core plugs, chosen using gridded minipermeability and conventional CTscan data of one or more core slabs.

13. The computer-implemented method according to claim 12 wherein the minipermeability data is gridded at a spacing of between about 0.5 cm and 1 cm.

14. The computer-implemented method according to claim 12 wherein the conventional CTscan data has a slice spacing between about 1 mm and 2 mm.

15. The computer-implemented method according to claim 1 further comprising building a flow model of heterogeneous rocks based at least in part on the generated interwell-scale digital rock modeling data.

16. A method according to claim 1 wherein the computed values being of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

17. The computer-implemented method according to claim 1 wherein the full-field-scale digital rock modeling data is generated using one or more techniques selected from a group consisting of: sequence stratigraphic modeling, outcrop analogs, isopach maps, facies proportion curves, seismic attributes, forward stratigraphic modeling, diagenetic modeling, basin-scale modeling, and/or multi-point statistics modeling.

18. The computer-implemented method according to claim 1 wherein the reservoir rock includes one or more types of lithologies selected from a group consisting of: carbonates, sandstones shales, coals, evaporites, and igneous or metamorphic rocks.

19. The computer-implemented method according to claim 1 wherein the generated interwell-scale digital rock modeling data includes one or more faults or fractures.

20. A system comprising a processing system for generating interwell-scale digital rock modeling data using a method according to claim 1.

21. The computer-implemented method according to claim 1 wherein the full-field-scale digital rock modeling data is generated using forward stratigraphic modeling.

22. A computer-implemented method of upscaling with a processing system, pore-scale digital rock modeling data representing reservoir rock, the method comprising:
  using the processing system to generate pore-scale digital rock modeling data at least in part using minipermeability and CTscan data from one or more core slabs of the reservoir rock, combined with pore geometry data;
  using the processing system to upscale the pore-scale digital rock modeling data to borehole-scale digital rock modeling data based at least in part on combining the pore-scale digital rock modeling data with borehole-scale source data; and
  using the processing system to upscale interwell-scale digital rock modeling to generate full-field-scale digital rock modeling data wherein the borehole-scale digital rock modeling data has been at least partially upscaled from pore-scale digital rock modeling data, wherein the upscaling to generate full-field-scale digital rock modeling data is based at least in part on computed values at an interwell-scale from the interwell-scale digital rock modeling data.

23. The computer-implemented method according to claim 22 wherein the pore geometry data is obtained using one or more technique selected from a group consisting of: transmitted laser scanning fluorescence microscopy, microCTscans, nanoCTscans, focused ion beam-scanning electron microscopy, mercury injection capillary pressure, and nuclear magnetic resonance.

24. The computer-implemented method according to claim 22 wherein the upscaling from pore-scale digital rock modeling data is based at least in part on computed values at a pore-scale, of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

25. A system comprising a processing system for generating upscaled borehole-scale digital rock modeling data using a method according to claim 22.

26. A computer-implemented method of upscaling with a processing system, borehole-scale digital rock modeling data, the method comprising:
  using the processing system to generate interwell-scale digital rock modeling data at least in part using well data from at least one non-vertical well;
  using the processing system to upscale the borehole-scale digital rock modeling data to interwell-scale digital rock modeling data based at least in part on combining the borehole-scale digital rock modeling data with interwell-scale source data wherein the borehole-scale digital rock modeling data has been at least partially upscaled from pore-scale digital rock modeling data; and
  using the processing system to upscale the interwell-scale digital rock modeling to generate full-field-scale digital rock modeling data wherein the borehole-scale digital rock modeling data has been at least partially upscaled from pore-scale digital rock modeling data, wherein the upscaling to generate full-field-scale digital rock modeling data is based at least in part on computed values at an interwell-scale from the interwell-scale digital rock modeling data.

27. The computer-implemented method according to claim 26 wherein the well data includes one or more types of data selected from a group consisting of: logging data, variogram statistics, cross-well seismic data, electromagnetic data, and seismic attributes data.

28. The computer-implemented method according to claim 26 wherein the upscaling from borehole scale digital rock modeling data is based at least in part on computed values at a borehole-scale, of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

29. A system comprising a processing system for generating upscaled interwell-scale digital rock modeling data using a method according to claim 26.

30. A computer-implemented method of upscaling with a processing system interwell-scale digital rock modeling data, the method comprising:
  using the processing system to generate full-field-scale digital rock modeling data; and
  using the processing system to upscale the interwell-scale digital rock modeling data to generate full-field-scale digital rock modeling data based at least in part on combining the interwell-scale digital rock modeling data with full-field-scale source data, wherein the upscaling to generate full-field-scale digital rock modeling data is based at least in part on computed values at an interwell-scale from the interwell-scale digital rock modeling data.

31. A method according to claim 30 wherein the full-field-scale digital rock modeling data is generated at least in part using one or more techniques selected from a group consisting of: sequence stratigraphic modeling, outcrop analogs, isopach maps, facies proportion curves, seismic attributes, forward stratigraphic modeling, diagenetic modeling, basin-scale modeling, and multi-point statistics modeling.

32. The computer-implemented method according to claim 30 wherein the upscaling from interwell-scale digital rock modeling data is based at least in part on computed values at an interwell-scale, of one or more properties selected from a group consisting of: porosities, permeabilities, capillary pressures, resistivity indices, relative permeabilities, water saturations, irreducible water saturations, residual oil saturations, recovery factors, and Archie cementation (m) and saturation (n) exponents.

33. A system comprising a processing system for generating upscaled full-field-scale digital rock modeling data using a method according to claim 30.

* * * * *